United States Patent
Duggal et al.

(10) Patent No.: US 9,106,849 B2
(45) Date of Patent: Aug. 11, 2015

(54) COMPARATOR IMPLEMENTATION FOR PROCESSING SIGNALS OUTPUT FROM AN IMAGE SENSOR

(71) Applicant: STMicroelectronics (Research & Development) Limited, Marlow, Buckinghamshire (GB)

(72) Inventors: Amar Duggal, Edinburgh (GB); John Kevin Moore, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 186 days.

(21) Appl. No.: 13/743,665

(22) Filed: Jan. 17, 2013

(65) Prior Publication Data

US 2013/0182164 A1    Jul. 18, 2013

(30) Foreign Application Priority Data

Jan. 17, 2012  (GB) .................................. 1200761.3

(51) Int. Cl.
| | |
|---|---|
| *H04N 5/335* | (2011.01) |
| *H04N 5/378* | (2011.01) |
| *H04N 5/357* | (2011.01) |
| *G05F 1/10*  | (2006.01) |

(52) U.S. Cl.
CPC .................. *H04N 5/335* (2013.01); *G05F 1/10* (2013.01); *H04N 5/357* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 6,281,831 B1 * | 8/2001 | Shou et al. ..................... 341/159 |
| 7,095,355 B1 | 8/2006 | Graham et al. | |
| 2007/0182838 A1 * | 8/2007 | Lee ............................... 348/308 |
| 2009/0167585 A1 | 7/2009 | Yeom | |

OTHER PUBLICATIONS

UKIPO Search Report for GB1200761.3 mailed May 11, 2012 (3 pages).

* cited by examiner

*Primary Examiner* — Albert Cutler
(74) *Attorney, Agent, or Firm* — Gardere Wynne Sewell LLP

(57) ABSTRACT

An image sensor includes an analog-to-digital converter receiving a pixel signal output. The converter includes a first inverting amplifier circuit having an input and an output, the first inverting amplifier circuit including a first bias circuit having a control node and configured to source current for first inverting amplifier circuit operation. The converter further includes a second inverting amplifier circuit having an input and an output, the second inverting amplifier circuit including a second bias circuit having a control node and configured to source current for second inverting amplifier circuit operation. The output of the first inverting amplifier circuit is coupled to the input of the second inverting amplifier circuit. A positive feedback circuit couples the output of the second inverting amplifier circuit to the control node of the first bias circuit.

24 Claims, 23 Drawing Sheets

COMPARATOR IMPLEMENTATION FOR PROCESSING SIGNALS OUTPUT FROM AN IMAGE SENSOR

PRIORITY CLAIM

This application claims priority from Great Britain Application for Patent No. 1200761.3 filed Jan. 17, 2012, the disclosure of which is hereby incorporated by reference.

TECHNICAL FIELD

The present disclosure relates to improvements in or relating to image sensors, and in particular to new circuitry for the readout of signals from a pixel array of a digital image sensor.

BACKGROUND

An image sensor is a device which senses light of an optical image and then converts it into the form of an electrical signal. Image sensors have developed from video camera tubes and nowadays to CCD or CMOS devices, which are used in modern cameras for consumer environments including DSLR and compact cameras, cameras for mobile telephones, webcams and optical mice; and industrial applications such as machine vision and automotive fields.

CCD's have historically been the preferred choice for image sensors in high performance digital cameras because they have historically been able achieve higher noise performance, with a lower dark current than their CMOS counterparts. However, recent advancements in CMOS noise performance have enabled CMOS sensors to become prominent in high performance cameras.

CCD's begin by projecting light onto a capacitor array which charges the individual capacitors. The charge on the first row is then transferred to a read out register and then onto an amplifier and analog to digital convertor (ADC). Once the first row has been read, its charges are deleted and the above row's charge is transferred down. This can be seen as a domino effect so all the above charges are moved down one row to fill the space. From then on the same process will read out the charge row by row to process the whole image.

CMOS image sensors are made up of an array of photo detectors which are contained inside the structure of a pixel. Light energy is taken from the photodiode and converted to charge by the CMOS pixel. The charge is then transferred and converted into a voltage with the use of transistors acting as switches. The signal can then be filtered by switched capacitor circuits and then processed by an ADC.

CMOS imagers also excel in the speed category. All camera functions can be integrated into the image sensor so signal distances are shorter with less capacitance, inductance and propagation delays.

For these and other reasons, CMOS sensors are of increasing commercial importance. In this fast moving and growing technical and commercial field it is therefore desirable to further improve the noise performance of CMOS image sensors.

SUMMARY

According to a first aspect of the present disclosure there is provided an image sensor comprising an array of pixels; a first ADC; a second ADC; a bias line common to both said first and second ADCs; and a positive feedback coupling between the bias line and the output of each of said ADCs.

Optionally, each ADC serves one column of pixels in said array.

Optionally, each ADC is formed within and as part of a pixel structure.

Optionally, the bias line is global to the pixel array and every ADC.

Optionally, a pixel-level bias line is split to form two or more localized bias lines, each of said localized bias lines being associated with a predetermined set of ADCs.

Optionally, each positive feedback coupling comprises a capacitor in connection between said bias line and each ADC output.

Optionally, at least one of said ADCs comprises a multistage comparator having a positive feedback coupling between the output of one stage and a current source of a second preceding stage.

According to a second aspect of the disclosure there is provided a mobile telephone comprising an image sensor which has an array of pixels; a first ADC; a second ADC; a bias line common to both said first and second ADCs; and a positive feedback coupling between the bias line and the output of each of said ADCs.

According to further aspects the present disclosure provides methods of image sensing and methods of making an image sensor comprising providing and/or using the structures disclosed herein.

In an embodiment, a circuit comprises: a first inverting amplifier circuit having an input and an output, the first inverting amplifier circuit including a first bias circuit having a control node coupled to the bias line and configured to source current for first inverting amplifier circuit operation; a second inverting amplifier circuit having an input and an output, the second inverting amplifier circuit including a second bias circuit having a control node and configured to source current for second inverting amplifier circuit operation; wherein the output of the first inverting amplifier circuit is coupled to the input of the second inverting amplifier circuit; and said positive feedback coupling connecting the output of the second inverting amplifier circuit to the control node of the first bias circuit.

In an embodiment,

BRIEF DESCRIPTION OF THE DRAWINGS

The present invention shall now be described, by way of example only, with reference to the accompanying drawings in which.

DETAILED DESCRIPTION OF THE DRAWINGS

Figure 1:
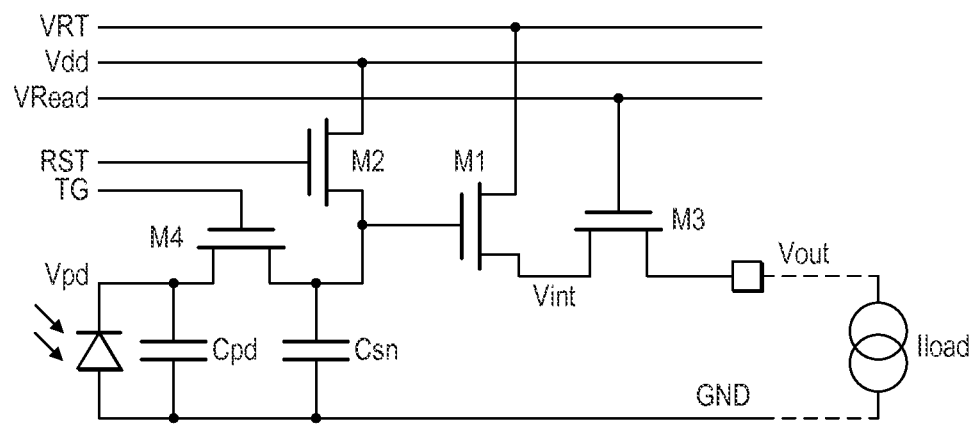
FIG. 1 illustrates the schematic of a 4 T active pixel.

There are various different types of pixels used with CMOS image sensors. The 4 T (so called because it has four transistors (T) per pixel) active pixel is ubiquitous within image sensors used today as many designs use this or a variation of this architecture. As shown in FIG. 1 the pixel comprises four transistors; reset (M2), source follower (M1), row select (M3) and transfer gate (M4).

The source of M4 is connected to a pinned photodiode and its drain is the floating diffusion. This is where the reset signal and noise is stored and this signal is sampled. M4 and the pinned photodiode have been optimized to remove all free electrons from themselves. This is to ensure that all the charge can be transferred without losing it to kT/C noise. In a 4 T structure, at the source of the M4 the N region is floating below a heavy p+ doped pin layer. With no PPD (pinned photodiode) there is no p+ layer and there is a significant capacitance between the source of M4 and PPD which results in lag. The job of the pinned photodiode is to separate the n type layer from the oxide. The PPD results in a reduced dark current through the effects of surface layer pinning.

Figure 2:
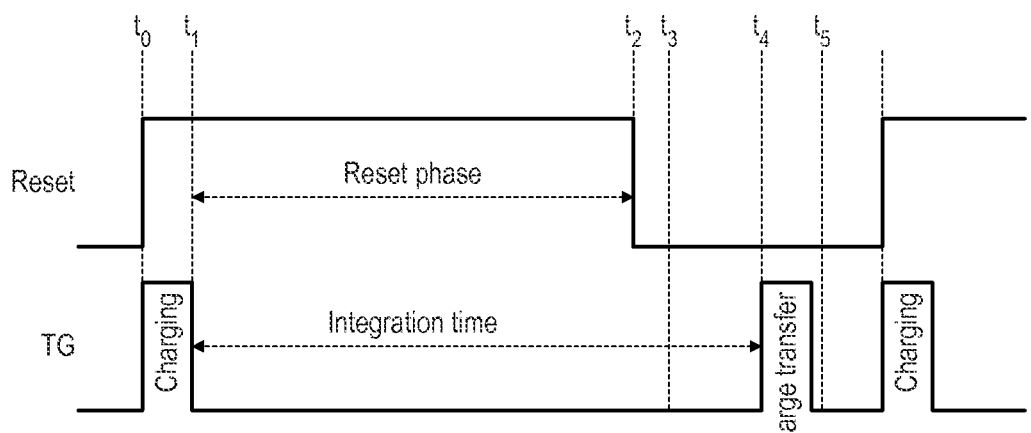
FIG. 2 is a timing diagram illustrating the operation of the pixel shown in FIG. 1.

Signal is transferred over the TG at times predetermined by the reset signal. When the TG is off the PPD is isolated from the readout node and is integrating across Cpd. Once the TG switch goes high the charge in Cpd can be thought of as decreasing by the value stored at the floating diffusion from the reset voltage. The timing diagrams of the 4 T pixel can be seen in FIG. 2.

For one whole cycle the 4 T pixel works through six phases; charge, reset, integration, signal transfer and sampling the signal twice. At time t1, the reset transistor sets the floating diffusion to Vdd minus charge injection and any voltage dropped across M2. At time t2, the reset transistor is turned off. The signal can be sampled onto a capacitor at the output by opening M3. This signal can be named BLK (black) but will also contain noise such as kTC, thermal from the SF and 1/f noise. TG is subsequently switched on to transfer all the charge accumulated at time t4, before the signal is then sampled again at time t5. This signal can be named SIGNAL. SIGNAL and BLK can then be subtracted to find the final output. This operation is known as correlated double sampling (CDS) and can eliminate reset noise at the output if the noise is the same. The main advantage of the 4 T pixel as compared with other pixel designs is that noise is greatly reduced. Also since there is no direct contact with the diode, a lower dark current is achieved. Despite this, there are still disadvantages which include poor fill factor and a reduced dynamic range because of smaller storage elements. The PPD's are also difficult to produce as they involve non standardized CMOS manufacturing processes.

Figure 3:
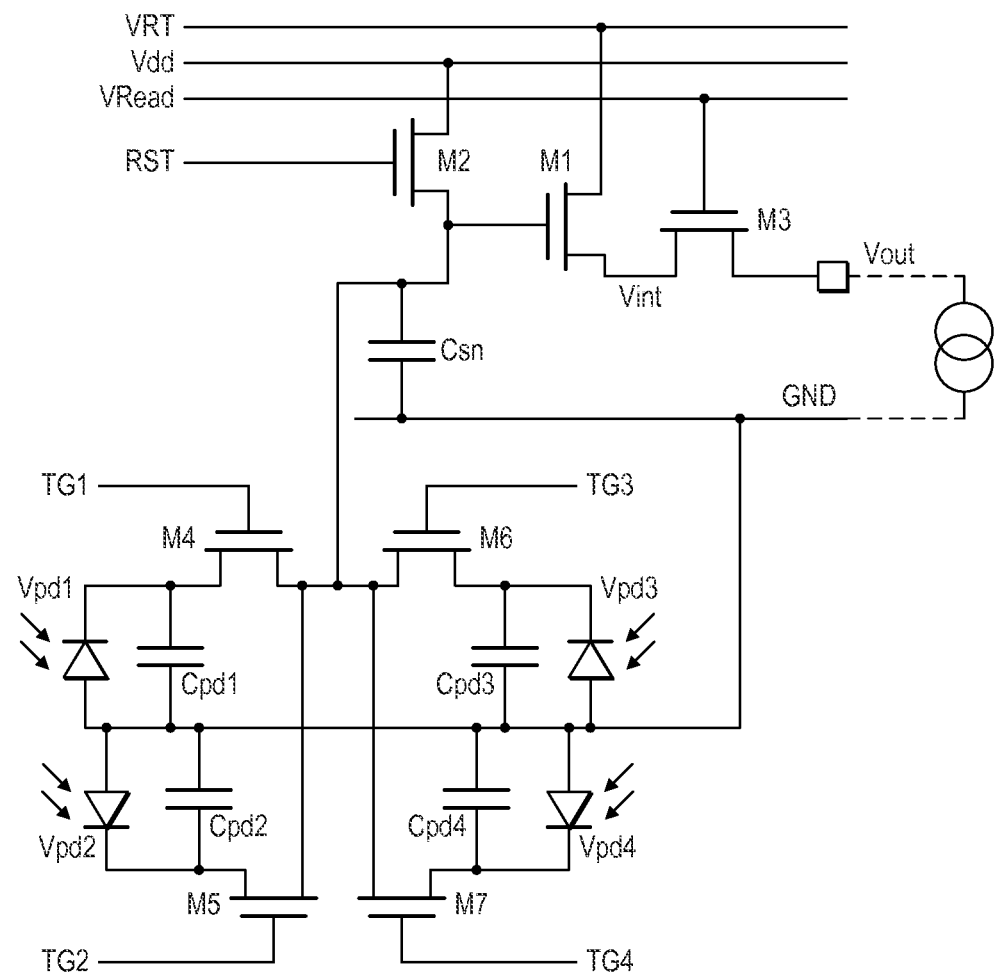
FIG. 3 illustrates the schematic of a 1.75 T active pixel.

An alternative pixel structure is the so-called 1.75 T configuration pixel whose schematic is shown in FIG. 3. This set up shares transistors for each pixel and has the advantage of saving area over the conventional 4 T pixel of FIG. 1. The 1.75 T structure comprises four pixels which share a single readout structure resulting in an effective 1.75 transistors per pixel. This can be seen as a variation in the 4 T set up, as the basic structure is the same and it operates in the same fashion.

This structure has similar advantages to the 4 T pixel, such as a lower dark current and gain at the pixel but also has the added benefit of an increased fill factor. The pixel consists of less circuitry because of four pixels sharing transistors, resulting in a smaller pixel which increases fill factor.

One of the most important aspects of the readout circuitry is the analog to digital convertor (ADC) structure.

The incoming analog signal used in image sensor ADC's is first low pass filtered before being processed through a sample and hold circuit. The final stages of the process are quantization and digital signal processing.

An ADC can be located within each pixel of an image sensor, at the end of each column or at the end of the whole array of pixels.

A pixel level ADC implementation is faster because of the short distance the analog signal has to travel and because all the ADCs can work in parallel; and furthermore has relatively low power consumption and high signal to noise ratio (SNR). However a pixel level ADC takes up a large amount of area and reduces the pixels' fill factor and so this design is rarely used in image sensor design, in particular for very large arrays such as those used as the main camera in a modern mobile telephone.

The chip level ADC can be seen as the inverse of the pixel ADC. Here the ADC is placed at the end of the total array of pixels. This architecture requires a high speed and high power ADC. As well as this, chip level ADC's are the slowest because a 'bottleneck' of data can occur from the pixels when a large array is used. However this ADC requires the least amount of area so this location can be implemented in a small area application.

Figure 4:
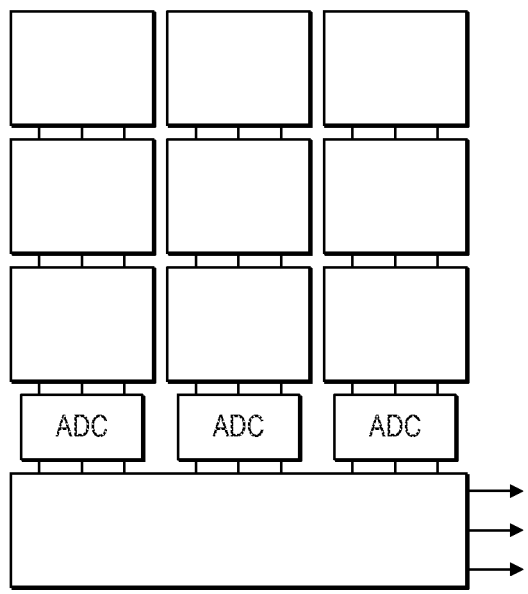
FIG. 4 illustrates the image sensor array layout of a column level ADC.

The column ADC is the most popular in the image sensor design industry. It can be seen as representing the middle ground between the pixel level and chip level ADC's. Here the ADC's are placed at the end of each column of pixels, as shown in FIG. 4. Each block in the 3×3 array above the ADCs represents a pixel, and a data bus is shown below the ADCs. There may be a single bitline common to each pixel in a column, or multiple as shown in FIG. 4.

This may use a parallel architecture so columns can be processed at the same time, resulting in increased speed. Since the ADC's are operating in parallel they can run at a lower speed themselves, resulting in low power consumption. Area constraints can also be met meaning this structure does not use an excessive amount of chip space.

The main drawback of this structure is the introduction of column fixed pattern noise due to mismatch between the ADC channels. This can be resolved however using techniques such as Dynamic Column Switching.

There are various different ADC architectures that may be used within a CMOS image sensor. These include flash, two-step, cyclic (also known as algorithmic), successive approximation register (SAR), pipeline, sigma delta, single slope, and dual slope.

Figure 5:
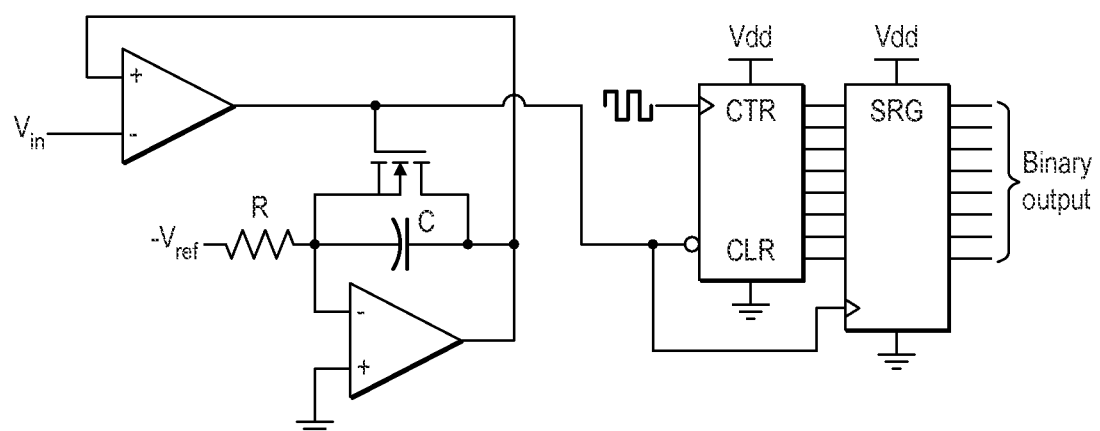
FIG. 5 illustrates the structure of a single slope ADC.

Of these designs, the single slope architecture is commonly used in the CMOS image sensor industry because of its high noise rejection, small area and high resolution. Also known as the integrating ADC, the main concept is to replace a DAC with an integrator to generate a saw-tooth waveform which is then compared against the analog input of the ADC. The time taken for the saw-tooth waveform to exceed the input voltage is measured by a digital counter, which is actually the digital interpretation of the analog value being sampled. Then the integrator is reset, ready for the next sample. A basic schematic is shown in FIG. 5.

The Single Slope uses an output buffer meaning the current value can be processed whilst a new value is fed into the ADC.

Single Slope ADC's in the column are now replacing pipelined ADC's within image sensors as they can convert data of the pixel much faster. This is a common trend among image sensor designers.

The comparator is a key component of an ADC, and is the main block of circuitry after the pixel which processes the light information from the pixel itself.

Figure 6:
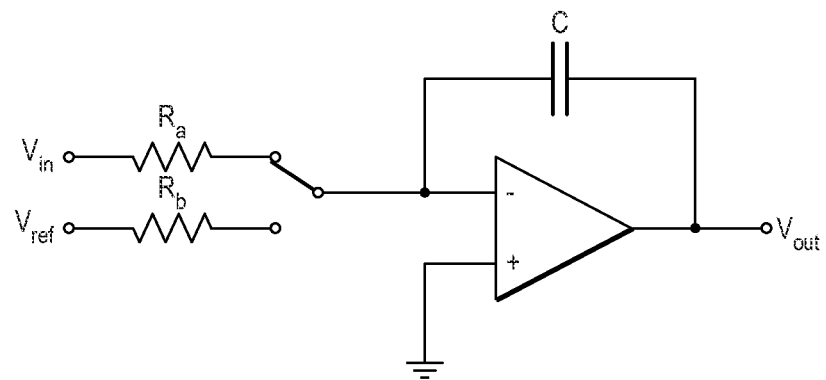
FIG. 6 illustrates the structure of a dual slope ADC.

The primary problem with the Single Slope ADC is calibration drift. The accuracy of this ADC is dependent on the matching of the digital counter and the slope. Here the rate of integration and the digital counter totally independent of each other so when the process ages, variation between the two is inevitable giving rise to an error. This problem can be solved using the Dual Slope ADC, as shown in FIG. 6.

Figure 7:
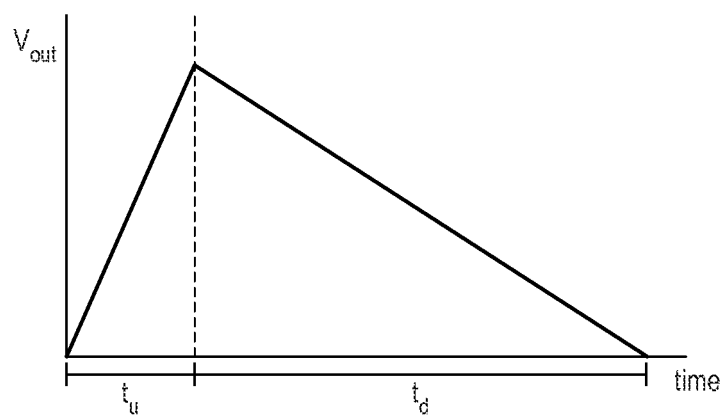
FIG. 7 illustrates the operation of the dual slope ADC shown in FIG. 6.

In this architecture two integrations are performed. The first is when the switch is set to $V_{IN}$ where the slope rises upwards. The operational amplifier integrates for a set number of clock cycles before the switch allows $V_{REF}$ to enter the integrator. This voltage is usually negative so the slope then falls. These operations are shown in FIG. 7.

The time $t_u$ is positive and a fixed integration period which is set by $V_{IN}$. The higher the input voltage, the higher the gradient of the slope. Once the number of clock cycles has been run, the switch is set to $V_{REF}$ and since this is negative the slope falls back to 0. This time is variable since the time taken to return to zero depends on $t_u$.

The maximum resolution cannot be increased to larger values by simply increasing the measurement time. The voltage range of the integrating amplifier will limit the output given by the integrator. If the measurement time is too long, saturation will cause the negative downtime to be meaningless. The main aim of this ADC is to solve the calibration error problem seen in Single Slope ADC's. As well as this the conversion accuracy of this ADC is independent of capacitor and resistor values.

Figure 8:
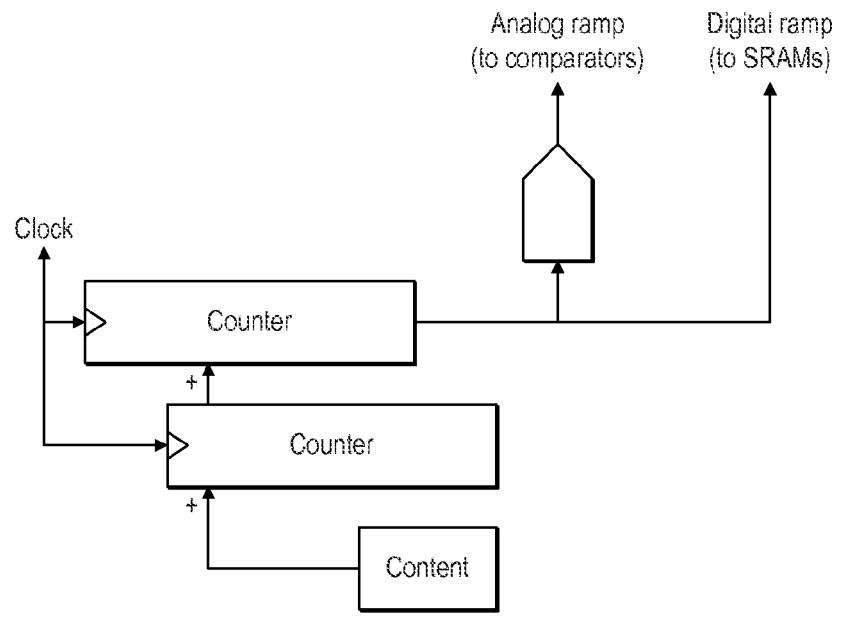
FIG. 8 illustrates aspects of a non-linear ramped ADC.

Another concept that the present disclosure may make use of is the use of a non-linear ramp in an ADC. This is applicable to single slope, dual slope, and other ADC architectures and is illustrated in FIG. 8, which shows a non-linear, typically quadratic, digital ramp generator comprising a memory device, an incremental counter, a ramp counter, and a DAC. The counters may be shift registers. The incremental counter comprises a processor, a clock input, an additive input and an output. The ramp counter comprises a processor, a clock input, an incremental input and an output. The incremental counter and the ramp counter receive a clock signal from the same clock (not shown) at their respective clock inputs. Receipt of the clock signal triggers the processor of the ramp counter to output a ramp code, RAMP, currently stored at the ramp counter to a DAC and a data storage device via the output. Typically, the ramp counter will have an initial code of zero, although non-zero initial codes are possible. Receipt of the clock signal triggers the processor of the incremental counter to output an incremental code, INC, from the output to the incremental input of the ramp counter. The clock signal also triggers the processor to read a stored incremental step code, INC_STEP, from the memory device and to add this to the incremental code, INC, stored at the incremental counter. Upon receipt of the next clock pulse the ramp counter outputs an updated ramp code being the sum of the previous ramp code and the incremental code, RAMP+INC. The ramp counter reads an updated incremental code, INC+INC_STEP, from the incremental counter and added to the updated ramp code. For example, the initial incremental code INC(0)=1, the incremental step is a predefined constant number INC_STEP=1/2, and the initial first ramp code RAMP(0)=1. RAMP(0) is incremented by INC(0), so RAMP(1)=2. Then IN(0) is incremented by INC_STEP, hence INC(1)=1.5. At the next clock pulse, RAMP(1) is incremented by INC(1), which is 1.5, so RAMP(2)=3.5. Typically, this process is repeated to produce a smooth quadratic digital ramp.

Figure 30:
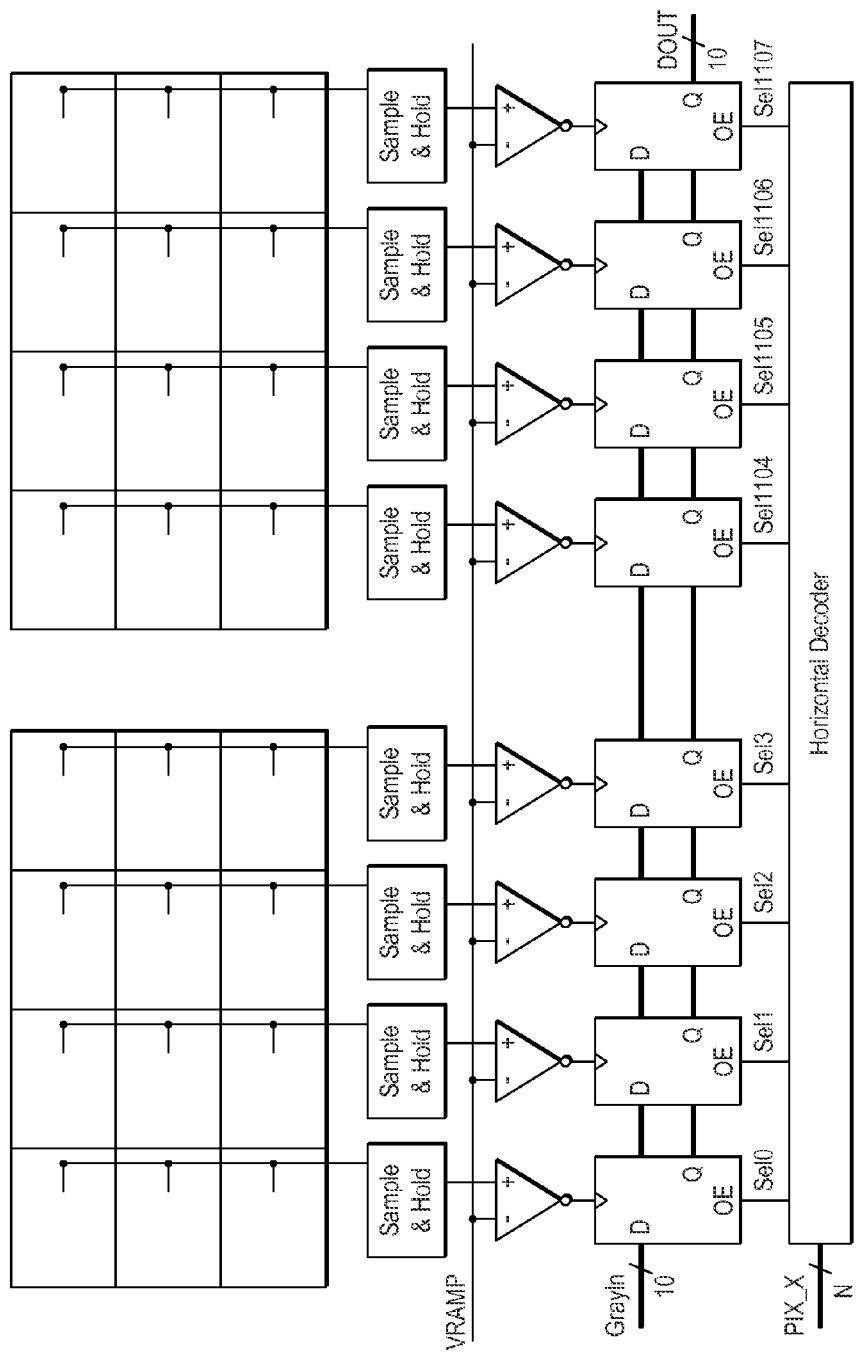
FIGS. 30 and 31 illustrate an embodiment of the disclosure, as may be applied to a "sample and hold" pixel readout architecture.

FIG. 30 illustrates a sample and hold type image sensor architecture. Readout circuitry is provided for readout of the pixels of the array (each block of the 3×4 array subsections shown corresponds to a pixel). The readout circuitry comprises sample and hold circuit, a comparator, and a latch. The comparator and the latch together form an ADC.

Figure 32:
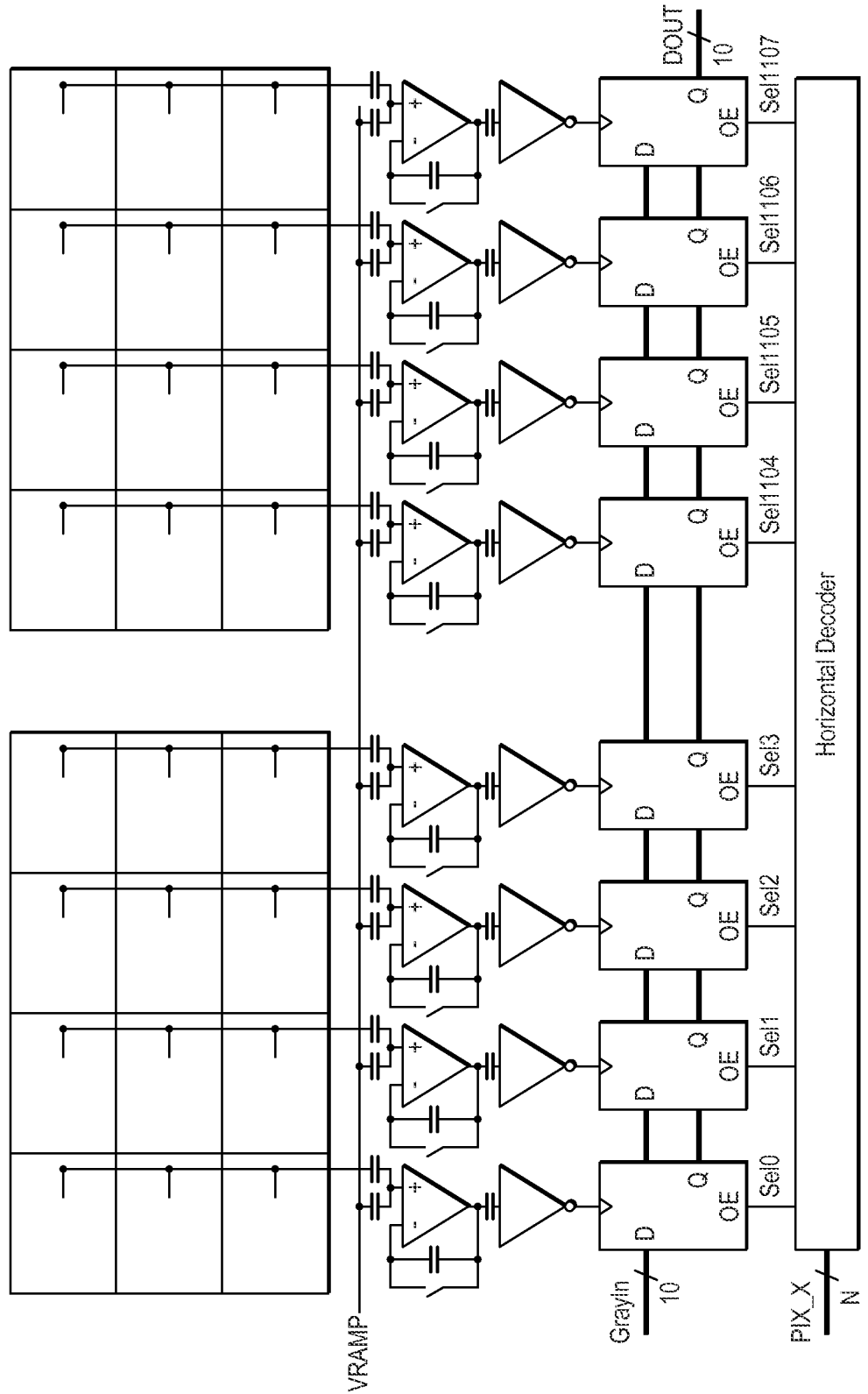
FIGS. 32 and 33 illustrate an embodiment of the disclosure, as may be applied to a "continuous time" pixel readout architecture.

FIG. 32 illustrates a continuous time type image sensor architecture. Readout circuitry is provided for readout of the pixels of the array (each block of the 3×4 array subsections shown corresponds to a pixel). The readout circuitry comprises sampling capacitors, an inverter circuit with autozero, a further inverter, and a latch. The inverters and the latch together form an ADC.

Figure 9:
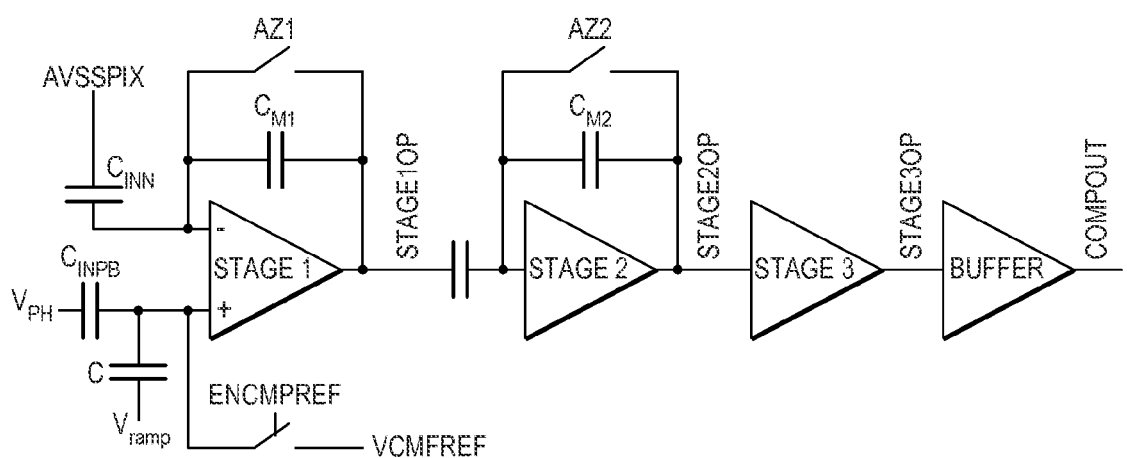
FIG. 9 illustrates an exemplary comparator design.

There are many different comparator designs, and the scope of this disclosure is not limited to any particular comparator design. For the purposes of illustration, FIG. 9 illustrates one example comparator design.

This example comparator has four stages. The first stage comprises a differential amplifier, the second and third stages are gain stages, and the fourth stage comprises a digital buffer.

The input is passed through four capacitors which can be thought of as one lumped capacitor which is in parallel with the capacitor leading the voltage ramp into the amplifier. The following three stages are amplifiers followed by a single digital buffer.

The light information from the pixel results in a voltage value which will be passed through to Stage 1 initially. As the light level increases the input voltage falls. However before any light information is passed through to the comparator, it is first auto-zeroed which places the amplifiers in the high gain region and also helps to eliminate any system offsets. It must be noted that only Stage 1 and Stage 2 are auto-zeroed. Stage 3's purpose is to extract more gain from the circuit, which reduces the noise.

Once all light information has been read out, the input voltage will start to ramp up as the DAC is enabled. As the ramp voltage increases the input nodes to the amplifier will also increase. This node will increase until it reaches its auto zero value where the increasing ramp will cause the comparator output to go high. This will result in the output DAC code (which was meantime increasing), to be written into a SRAM memory cell. This operation can occur in parallel for every column, and is repeated for every row. To ensure the output transition is always low to high an offset is applied to the ramp.

Figure 10:
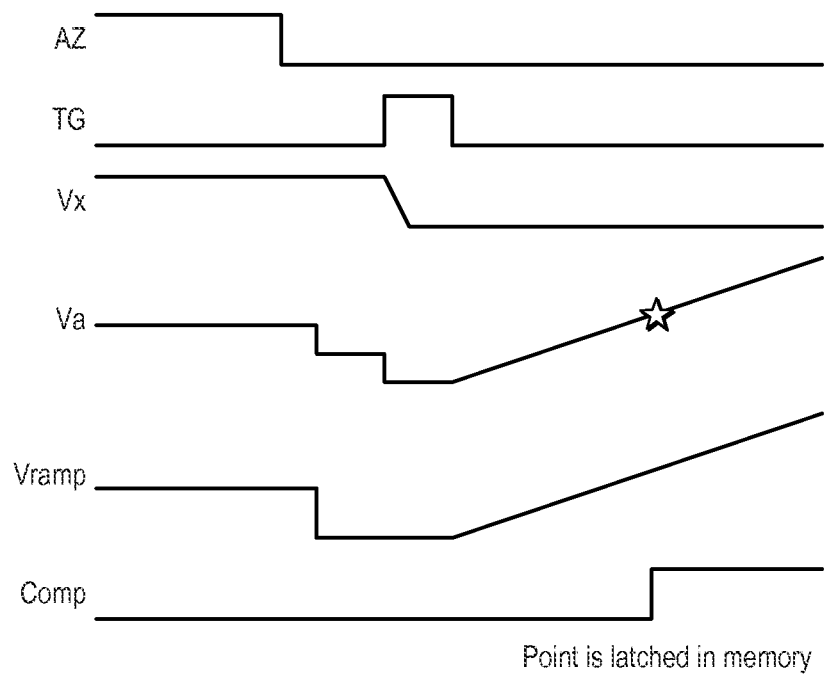
FIG. 10 is a timing diagram illustrating the operation of the comparator of FIG. 9.

The timing for each stage in the comparator is illustrated in FIG. 10, in which AZ is the auto zero of the amplifier, TG is the Transfer Gate which controls the transfer of charge from the photodiode to the sense node, $V_x$ is the pixel output voltage, V, is the amplifier input node, $V_{ramp}$ is the voltage ramp and Comp is the comparator output.

In essence, the amplifier is balanced, before the low input from the pixel ($V_x$) is used as an input to the amplifier. Next the input of the amplifier starts to rise again as it is tracing the increasing ramp voltage which will cause the first stage to go high.

The comparator will flip once $V_a$ has reached a value equal to the fall of the input, $V_x$ in addition to the negative ramp offset.

It should be noted that any sample and hold circuitry which could be used for CDS would be before the input of the comparator.

The first stage is a high gain stage which is auto zeroed. Once the auto zero operation has concluded the amplifier operates in a closed loop configuration. Since this stage is a low frequency gain stage, it can be approximated by: Gain=Av1=C1/2$C_{AZ1}$ where C1 is the input capacitor to one input of the amplifier and $C_{AZ1}$ is the capacitor over which the first auto zero operation takes place. Ideally these capacitors should be the same type to minimize smearing and also large enough to dominate parasitic capacitances. Stage 1 must also meet settling time requirements which are defined by video timings. This can be adjusted by modifying the frequency response of this stage.

Figure 11:
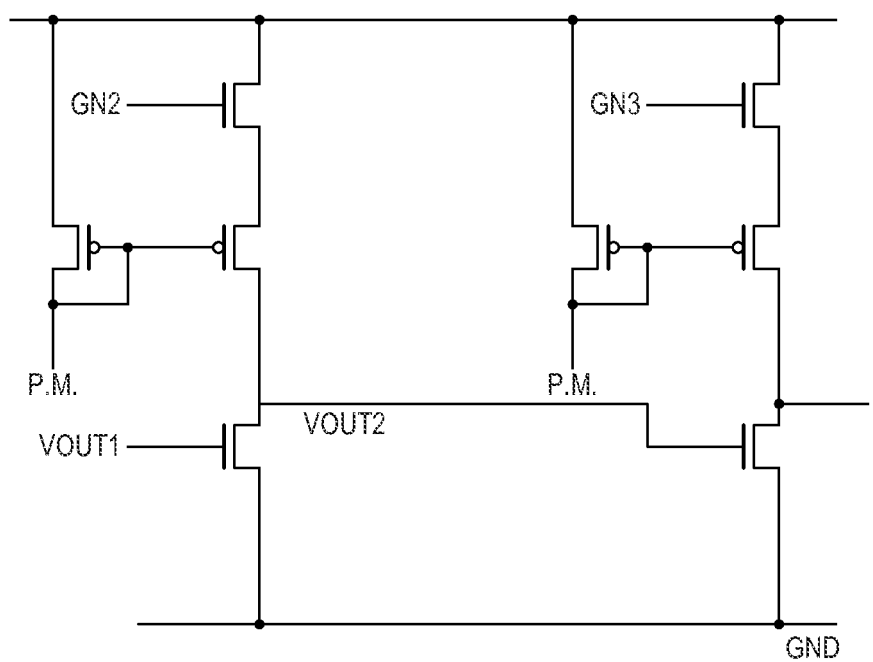
FIG. 11 is a circuit schematic showing selected comparator stages.

FIG. 11 shows a schematic of the gain stages 2 and 3. Stage 2 acts in the same closed loop configuration as Stage 1. It is autozeroed and is still acting as a gain stage. The low frequency gain for Stage 2 is approximately: Gain=Av2=C2/$C_{AZ2}$ using similar notation as used above for Stage 1. This stage is similar to Stage 1, allowing the timings to be set by the frequency response.

The purpose of Stage 3 is to provide enough gain to ensure that the input signal results in an output value which will swing to the rail. This stage is not auto zeroed and so in principle device mismatch may be problematic, however simulation shows that the distribution of the delay in this module is acceptable.

Stage 4 is a CMOS digital buffer which is made up of a series of invertors. This has the function of level shifting the data from the analog supply to the digital supply. The final output value is then stored in SRAM in the next stage of the image sensor readout processing. The buffer incorporates an enable function which defines the output.

As described above, a comparator will flip at a particular time, once the amplifier input node (V, in FIG. 10) has reached a value equal to the fall of the input ($V_x$ in FIG. 10) in addition to the negative ramp offset. The timing of this flip point will ideally be identical each time the comparator is operated. However there will in practice be some variation in the exact time when the comparator will flip. This variation in timing forms an effective measure of the noise of operation of the comparator. This noise can be modeled using transient noise simulations, for example using the ELDO circuit simulator available from Mentor Graphics Corporation. This tool (and others) can be used to simulate the noise for applications with time varying DC operating points. The noise can be expressed either in terms of a voltage or in equivalent codes.

Figure 12:
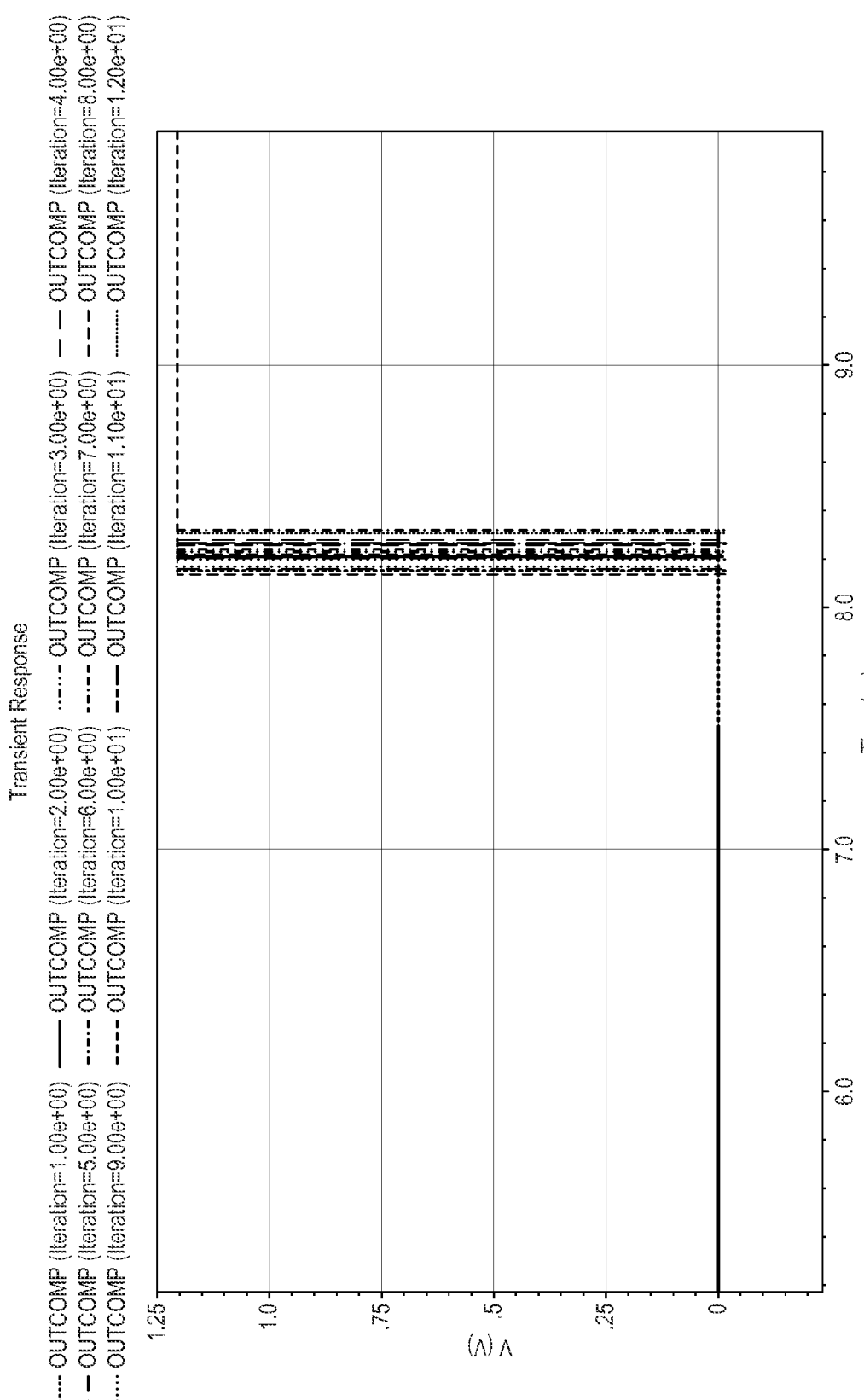
FIG. 12 shows a transient noise simulation of a comparator output.

When transient noise simulations (known herein in short as "NoiseTran"s) are being run, the output of the comparator is the area of most interest. From analyzing where the comparator has flipped, its noise value can be determined. The Noise-Tran simulations work on the basis of a Gaussian distribution where random noise is used to simulate the noise in the transient arena. FIG. 12 is a plot of a comparator flipping with many different iterations during a noise transient simulation.

From this figure it can be seen that over many different iterations the comparator has flipped at different times and not the same time for every run. This indicates there is noise in the system. To work out this noise value in codes, the standard deviation must be found of the range of noise transient simulation. Using the example above the range is approximately from 8.15 µs to 8.25 µs. This spread of 100 ns corresponds to a noise of 8 codes in a system with an 80 MHz clock.

Figure 13:
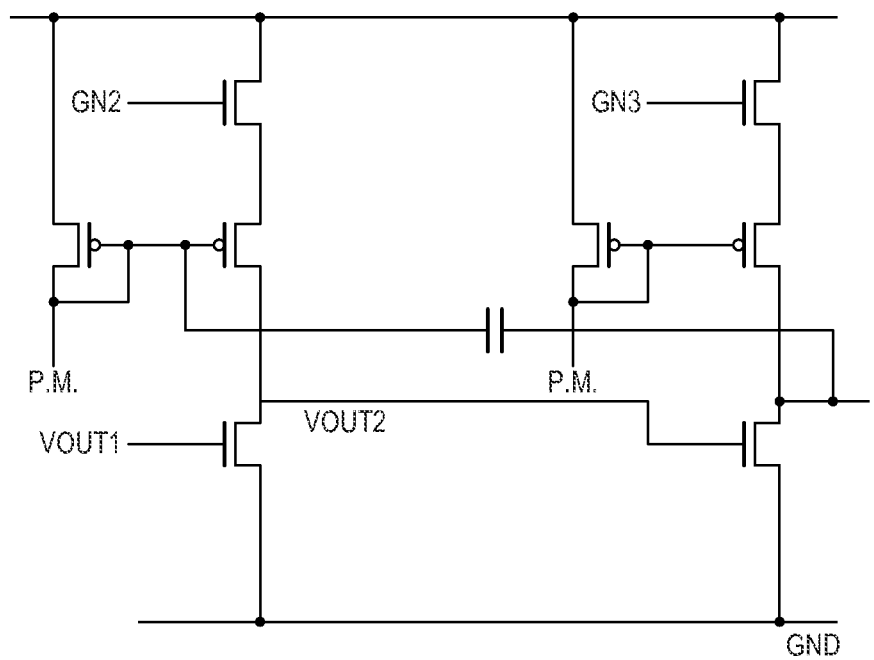
FIG. 13 illustrates aspects of a comparator design according to an embodiment of the disclosure.

The inventors have determined that the noise of an ADCs operation can be improved by the incorporation of a particular coupling. An example of this coupling is illustrated in FIG. 13, for the example of a multi-stage comparator.

This figure shows a schematic of the gain stages 2 and 3. It is similar to the schematic of FIG. 11, except a coupling is formed between the output of the third stage with the current source of the second stage.

This coupling provides various effects and advantages, which will be discussed below. However, these effects and advantages are not limited to the coupling of a "third" stage to a "second" stage of the exemplary comparator structure illustrated in the figures referred to above. In fact, one or more of these effects and advantages, and various other effects and advantages, can be attained by coupling the comparator stages to a common bias line, for example by providing a coupling between the output of one stage to the current source of another, preceding, stage. This preceding stage will normally be the immediately preceding stage.

A comparator stage "precedes" another stage in the sense of being closer in a sequence of stages to the pixel array, that is, the outputs of the pixel array are processed by a preceding stage before a subsequent stage. The inputs for a given comparator stage are provided by the outputs of the immediately preceding comparator stage, except of course for the first stage of a comparator, which receives data direct from the pixel array.

This coupling is the form of a capacitance, which may in preferred embodiments be provided by the formation of a capacitor, which may be selected from any type suitable for the relevant size and capacitance requirements, for example, a metal fringe capacitor, metal plate capacitor, metal-poly plate capacitor.

In general, positive feedback loops can be detrimental to circuit design, as their incorporation risks introducing oscillations into the circuit which in turn can cause the circuit's operation to become unstable.

However, the creation of a positive feedback loop in the circuit by providing a coupling between the output of one stage to the current source of a preceding stage means that the comparator flips more quickly and with less noise.

In the example of FIG. 13, the positive feedback connects the output of the third stage back to the PMOS current source of the second stage. The second and third stages of the comparator are inverting amplifiers so when the third stage falls, this couples back to the current source of Stage 2, decreasing the voltage on the PMOS transistors. This increases the current flow as the transistors turn on more and in turn then increases VOUT2 before the diode connection resurrects the balance. Once VOUT2 rises with increased speed, VOUT3 is pulled down at a faster rate.

Figure 14:
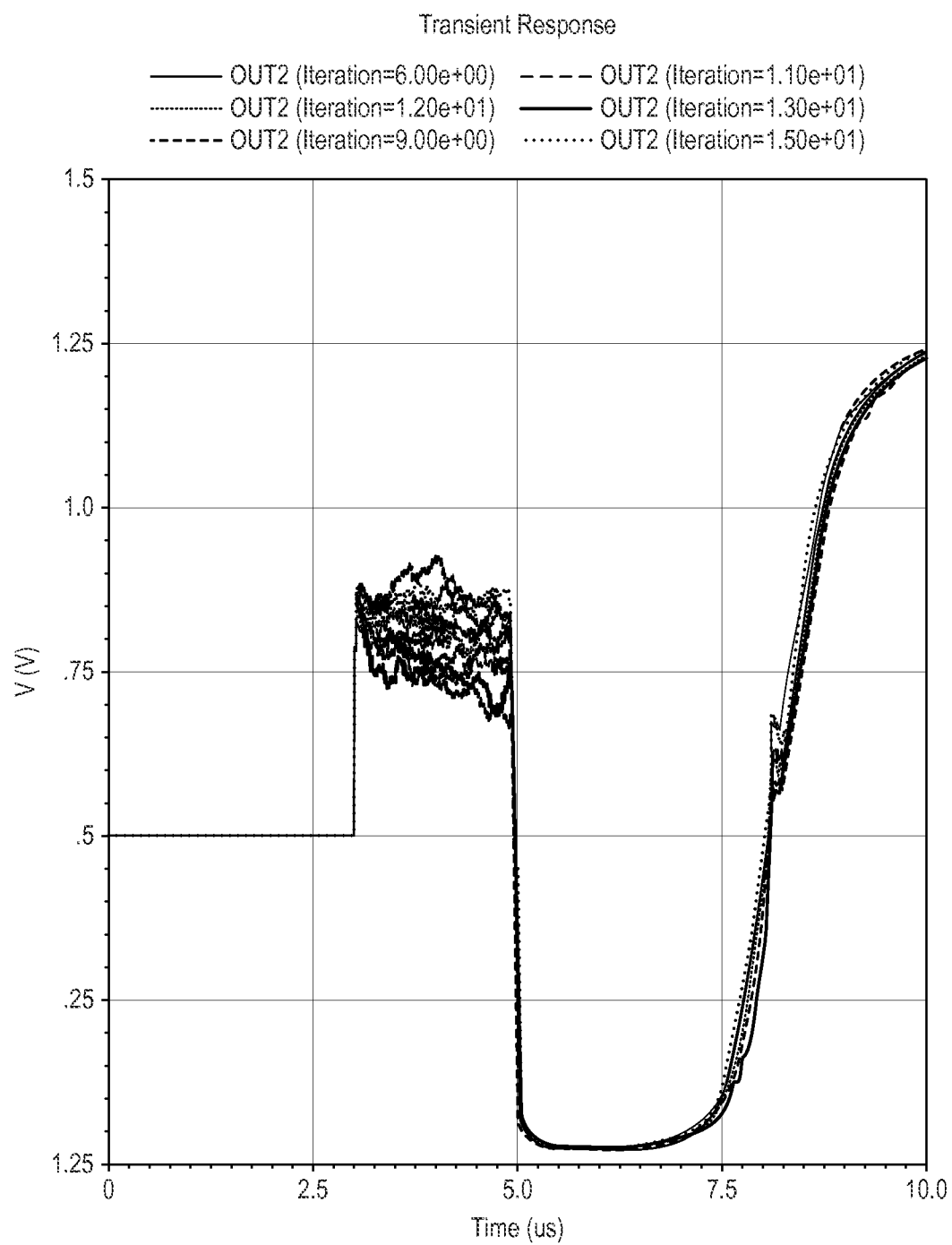
FIG. 14 shows a transient noise simulation of a comparator second stage, as illustrated on the left hand side of FIG. 13.

This sequence of events is shown in the NoiseTran of FIG. 14.

Figure 15:
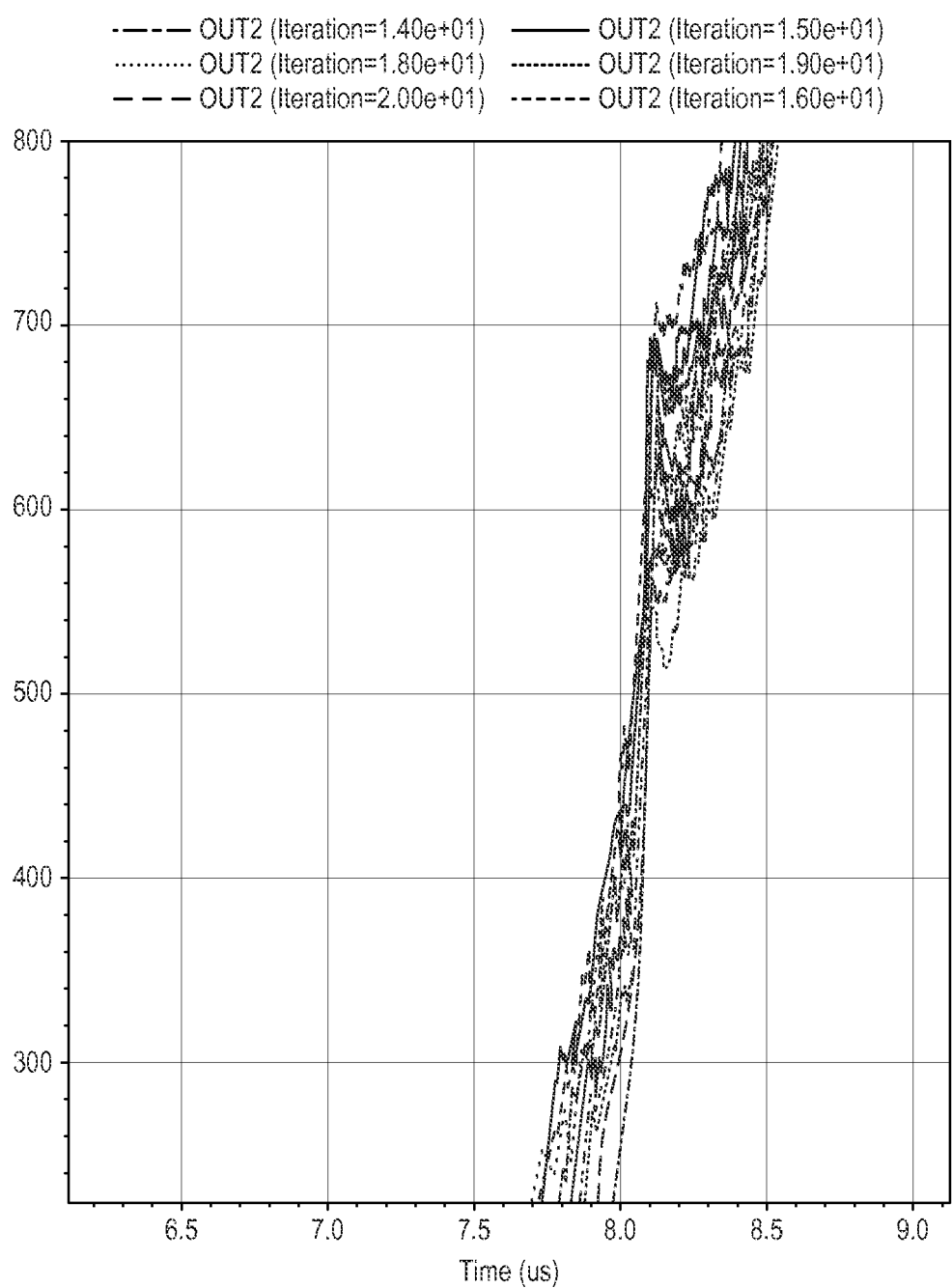
FIG. 15 is a zoomed in view of the transient noise simulation of FIG. 14.

Here, it can be seen that there is a sharp rise in the rate of increase regarding the output when a transient simulation is run. This is shown in FIG. 14 at approximately 8 µs. If one was to zoom in to the area at approximately 8 µs, the increased rate of change is clearly visible. This is shown in the NoiseTran simulation in FIG. 15.

As seen in this NoiseTran simulation result all the noise transient runs are effectively pulled together (i.e. the variation is reduced) before the increased rate of change. The comparator is seen to flip at the point where the runs are pulled together. Therefore, the output noise is lower. This increased rate of change is due to the addition of the coupling as described above and the resulting retrospective positive feedback.

Figure 16:
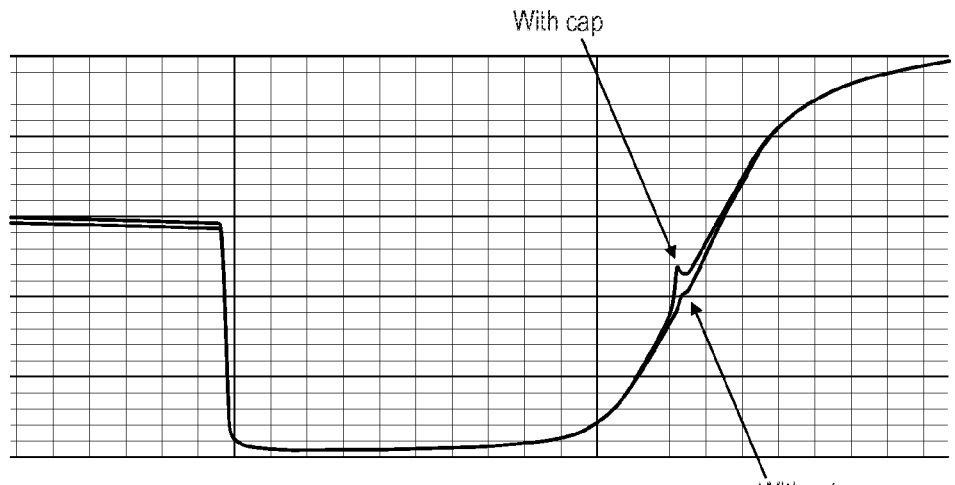
FIG. 16 illustrates a comparison of a comparator stage 2 output in the case of the comparator design as shown in FIG. 13 ("With cap"), with the comparator design as shown in FIG. 11 ("Without cap")

If the feedback is absent, there is no increased rate of change is not seen and the rise is gradual. This was confirmed when running the simulation with and without the capacitor and the result is displayed in FIG. 16, which clearly shows the increased rate of change with the capacitor added. The units are neglected as they are not of interest currently.

It has been found that a small capacitance coupled in this way can significantly increase the noise performance of the comparator. The inventors have performed tests on an example comparator layout that indicate a 0.6 fF capacitance can reduce the noise by two codes in a 10 bit system. The actual magnitude of capacitance used and the magnitude of the resulting noise improvement will vary according to the design of the comparator and the image sensor array with which it is used.

With the rate of change of the preceding (second) stage increasing, the time required for the comparator to flip is decreased. This is shown in FIG. 17.

Figure 17:
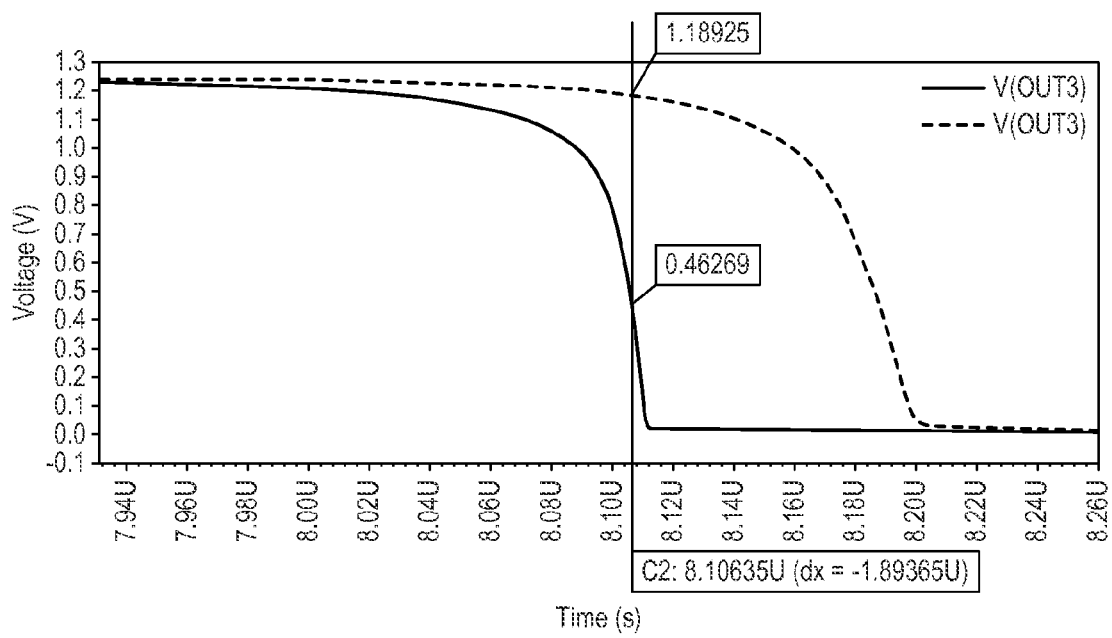
FIG. 17 shows the increase in speed of the "With cap" comparator design with respect to the "Without cap" comparator design.

FIG. 17 shows the results of running transient simulations with and without the capacitor whilst probing the output. The direct effect of the capacitor was needed so the output of stage 3 was plotted. Stage 4 is a digital buffer so its effect was neglected at this moment. The upper curve of the figure shows the comparator flipping without the capacitor and the lower curve shows the comparator flipping with the capacitor added. As seen, there is an approximate 0.1 µs decrease in flip time which is equivalent to around 8 codes with a ramp running at 80 MHz.

Figure 18:
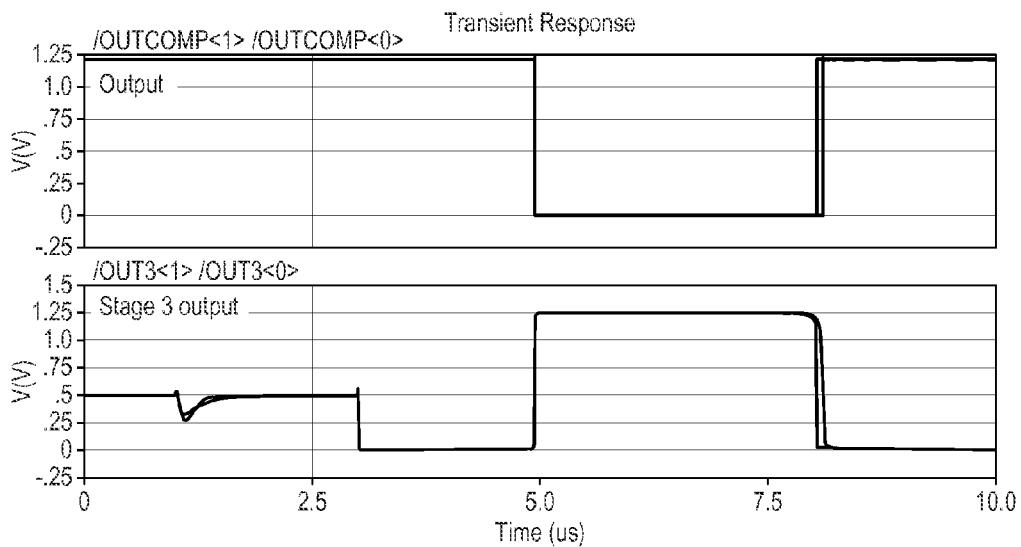
FIG. 18 shows the stage 3 and the final stage comparator flipping with and without the capacitor added.

By enabling the comparator to flip earlier the value is stored in SRAM quicker and so decreases the total image sensor readout time. It can be seen that the buffer adds minimal delay onto the signal output by also viewing the final output of the comparator. FIG. 18 shows Stage 3 and the final stage flipping with and without the capacitor added.

It can be seen from FIG. 18 there is very little difference in the comparator flip time between stage 3 and 4, with and without the capacitor added. The effect of adding a digital buffer at the output can be neglected and a definite speed increase can be seen.

Figure 19:
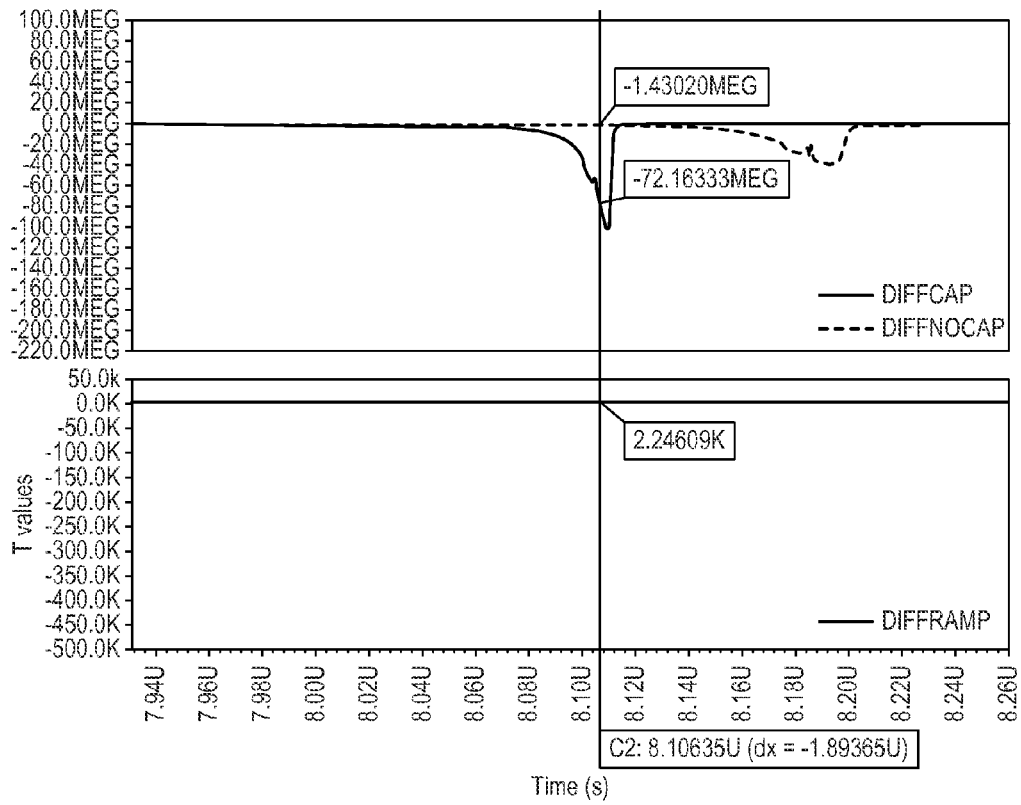
FIG. 19 illustrates differentiated plots of the results shown in FIG. 17.

When differentiating the graphs plotted in FIG. 17 (Stage 3 Outputs) and also the input ramp the following equation was used to find the gain with and without the capacitor: Gain=$V_{OUT3}$ Differentiated/$V_{RAMP}$ Differentiated. FIG. 19 illustrates these differentiated Stage 3 outputs, for the cases with and without the additional coupling.

The top graph shows both outputs, with and without the capacitor differentiated where the lower plot (earlier y-axis drop) is with the capacitor added and the upper plot (later y-axis drop) without. The bottom plot gives the result of the input ramp differentiated. The gains at the flip point with and without the capacitor were compared, and it was seen that the effective gain with the capacitor added is almost double that of the circuit with no capacitor at the flip point. This result gives a direct correlation with the noise being approximately halved when the positive feedback loop is present. It could be concluded that the increased rate of change in Stage 2 was due to the increased gain at that moment in time which caused a noise filtered-like output to the comparator.

It has been found that if the capacitance of the additional coupling is increased too much, the comparator's operation becomes unstable. The comparator tends to fire multiple times before the time when it is meant to, meaning there is a risk of an incorrect value being stored in the SRAM cell in the readout chain. The exact value of the capacitance to be incorporated should be well controlled and should be protected from any additional parasitic capacitances that may affect operation.

The noise reduction provided by this disclosure is most useful in regions of an image which have relatively low frequency image data, that is, "flat" portions of an image where the color of the scene is approximately the same (for example, the sky). In that case, the comparators should all fire at the same time, and so the pulling together of the NoiseTrans runs will have a dramatic effect on the effective noise of the image, as discussed above. However, even if the effect of the disclosure is less pronounced in regions of high frequency image data, the overall utility of the disclosure is not compromised because noise in an image is most visible to a human viewer of the image in the flat portions of the image, which are the very portions in which the disclosure has the greatest effect. For example, "speckles" caused by the noise would be more noticeable to a viewer in an image portion showing the sky rather than in an image portion showing foliage.

It is however, instructive to consider the case of an image that is not "flat", that is, one where the comparators do not all fire at the same time.

For a column based ADC, all comparators are in fact connected by the new coupling to the same global current bias line. This means that, if all comparators fire at the same time, the total capacitance connected to the node is the value of the capacitance of the coupling multiplied by the number of columns (assuming the couplings of all columns are equal). However, if only one comparator fires at a given time, then the capacitance coupled to the current bias line would only be the value of the single capacitance coupled to that comparator. The number of columns will depend on the size of the pixel array being used, but a typical value for the purposes of illustration is an array comprising 2624 columns.

Figure 20:
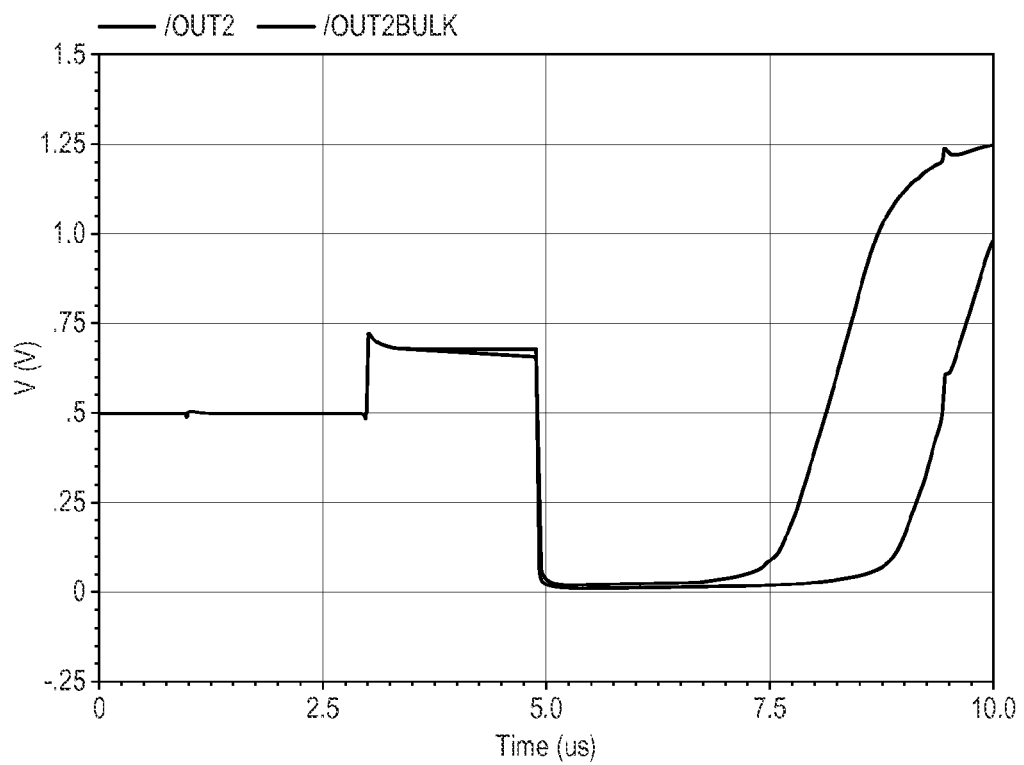
FIG. 20 shows the output of a test carried out on the comparator structure of FIG. 13, showing the Stage 2 output of one comparator fired at one time, compared with the rest of the comparators in a pixel array being fired at a later time.
Figure 21:
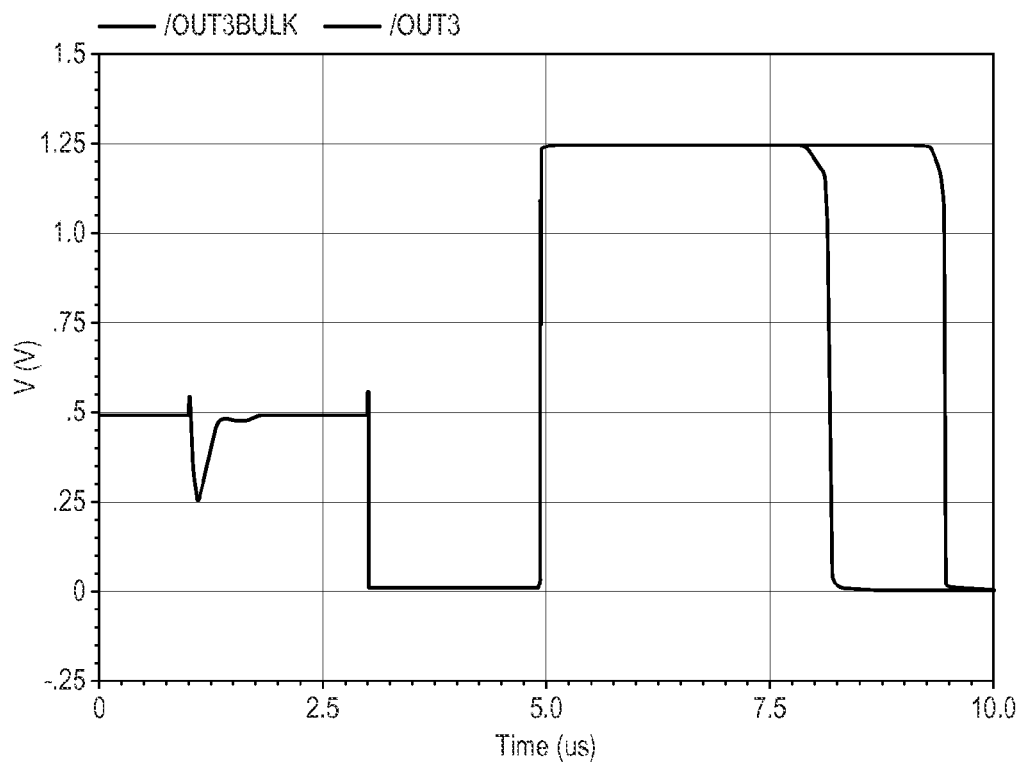
FIG. 21 shows the output of a test carried out on the comparator structure of FIG. 13, showing the Stage 3 output of one comparator fired at one time, compared with the rest of the comparators in a pixel array being fired at a later time.

To see the effect of this, a test was carried out where only one comparator fired at the previous time and the other 2623 fired 1 μs later. The results of this are shown in FIGS. 20 and 21, which show the outputs of Stage 2 and Stage 3 transient simulations respectively. The single comparators firing are labeled OUT2 and OUT3, while the remaining 2623 are labeled OUT2BULK and OUT3BULK.

In both FIGS. 20 and 21, the plots rise and fall the graph to the left is the original one comparator firing and the other is the following 2623 comparators firing approximately 1 μs later. The graph of particular interest is FIG. 20 as it clearly displays the effect of the majority of comparators. It can be seen the 2623 comparators flip at around 9 μs and this is where the increased rate of change is present, highlighted by the small blip. Since the total capacitance of the 2623 comparators on the current bias line is much greater than the one comparator, they have a direct effect on the original comparator and this is seen as it has an increased rate of change at also 9 μs.

Subsequently, it is valid to conclude that the majority of comparators have a direct effect on the one comparator as they have a larger total capacitance. This is due to the common current bias across every comparator.

Figure 22:
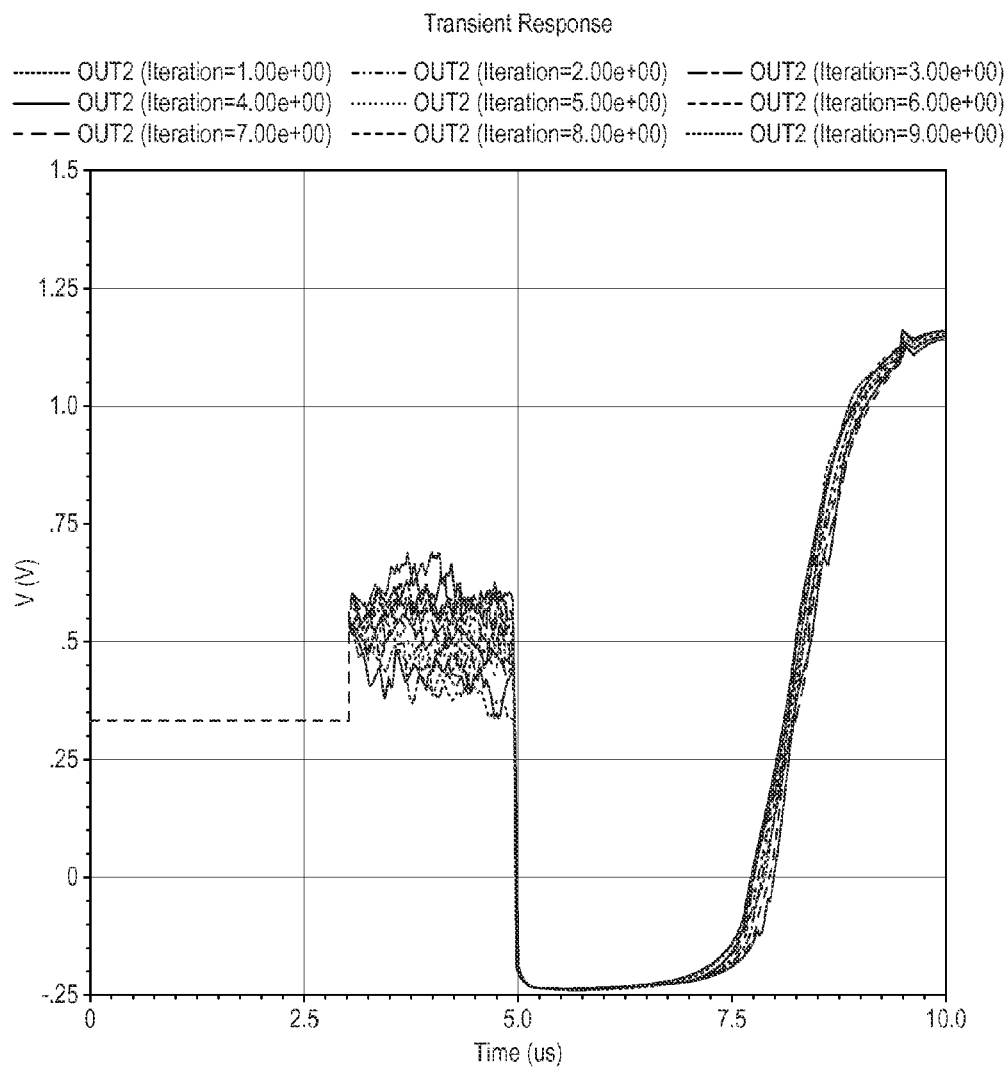
FIG. 22 shows a transient noise simulation of a single comparator second stage, as illustrated on the left hand side of FIG. 13.
Figure 23:
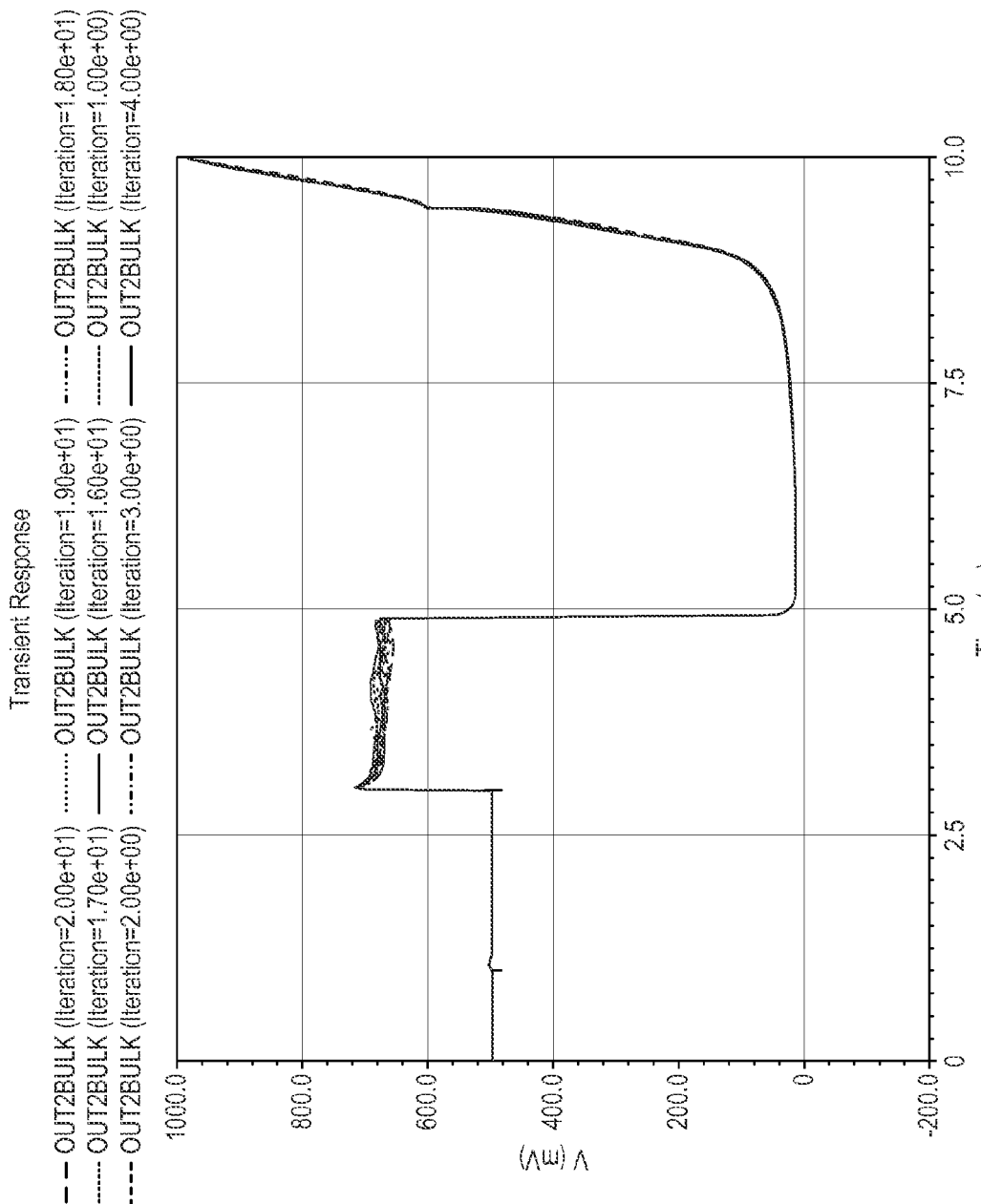
FIG. 23 shows a transient noise simulation of 2623 comparator second stages, as illustrated on the left hand side of FIG. 13.

FIG. 22 shows one comparator firing, and FIG. 23 shows the other 2623 comparators, labeled as 'BULK', firing 1 μs later at the output of Stage 2.

FIG. 23 shows that multiple comparators have lower noise than one comparator, as the noise runs are much tighter with a lower standard deviation. The increased current on the global bias caused by the positive feedback has allowed the runs to be much tighter and less noisy. The auto zero in Stage 2 appears to have less noise when multiple comparators fire, which contributes to lower noise in the followings stages.

This shows that the noise reduction has greatest effect when the comparators are presented with a flat image. However as mentioned above it is beneficial that this noise reduction occurs when the image is flat, since it is in this case that noise is likely to be more apparent to the human eye.

The effect of the comparators on each other causes a problem with smearing of an image. Ideally, the flip point of a single comparator should be independent of whether it fires on its own or at the same time as the other comparators. However as shown in FIGS. 20 and 21 above, the timings of the flip points of the comparators do have an effect on each other. This dependence of one comparator on the behavior of other comparators is undesirable and results in smearing. The effect is particularly pronounced when many comparators flip at once, meaning that the remaining comparators are pulled in the same direction.

Figure 24:
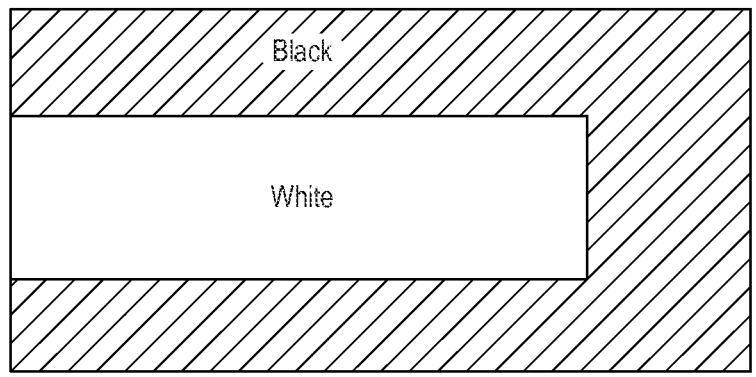
FIG. 24 illustrates an image with no smearing effect.
Figure 25:
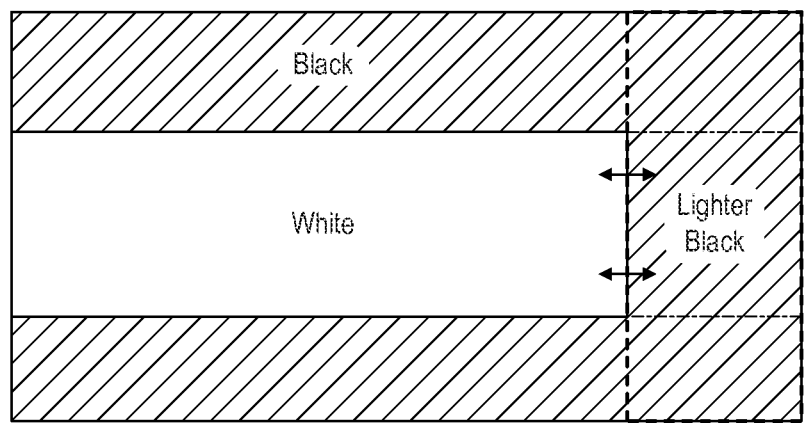
FIG. 25 illustrates an image with a smearing effect.

An example of this would be two shades of black in an image when the image should be one hard black color, as illustrated in FIGS. 24 and 25.

FIG. 24 shows what an "ideal" image should look like. The white and black areas should be totally separate and have no influence on each other. However in reality many comparators firing at one point will affect subsequent neighboring comparator's flip points. The consequence of this is having two blacks for example, which do not match up as they should. FIG. 25 shows how this effect would be noticed.

The area labeled 'Lighter Black' is where smearing would be most noticeable in an image. The white section would have an effect on where the next black comparators should fire and so the timing would be modified, giving a slightly lighter black occurring in the portion directly to the right of the white area compared to the rest of the black at the corners on the right hand side of the diagram.

The smearing effect varies with the value of the capacitance in the coupling. The capacitance could be reduced in order to reduce smearing, but this would have a direct effect on the ratio by which the temporal noise is reduced by.

However, the inventors have found a way to reduce the smearing while at the same time retaining the improved temporal noise performance of the positive feedback. This has been achieved by splitting up the current bias. By constructing local current biases for different groups of columns the capacitance of the positive feedback coupling only affects those local current biases rather than affecting a global bias line. At the same time the total amount of capacitance on the node would decrease but it would do so proportionally, so the low noise effect would still be present.

By splitting the comparators into effective blocks, smearing would be introduced only between these blocks. One block may not have the same value for black as its neighboring block. This type of smearing would be less harsh on the eye however, compared to global smearing effects.

Each block of comparators would have one diode connection as opposed to the previous set up where all column comparators had one diode connection globally. As with introducing a bias for every block of comparators the current bias would have also had to be modified to be able to feed all the biases.

Referring to the exemplary comparator implementation of FIG. 13, for every block of comparators, one NMOS mirror is introduced and so a PMOS mirror is required within the global bias block itself.

The size of the blocks may be chosen freely. The inventors have tested blocks of 16, as for the specific circuits under test this number provided optimum performance in terms of recovery time for the current bias to operate and also the amount of wasted current which would be burned to set up 16 comparators. Other block sizes, for example, 8 or 32, might be optimal depending on the specific circumstances.

Figure 26:
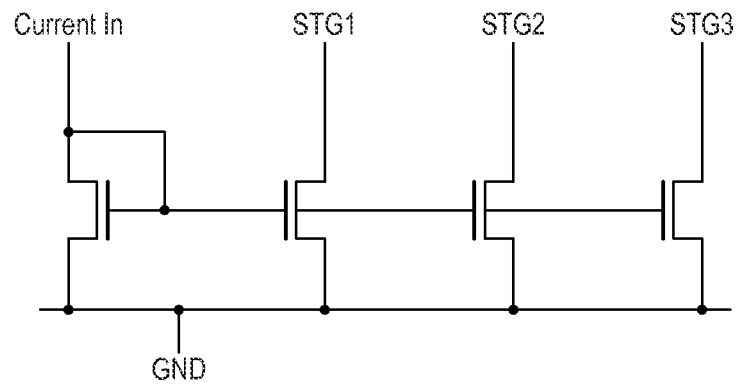
FIG. 26 illustrates a localized current bias line, in comparison with a global current bias line.
Figure 26:
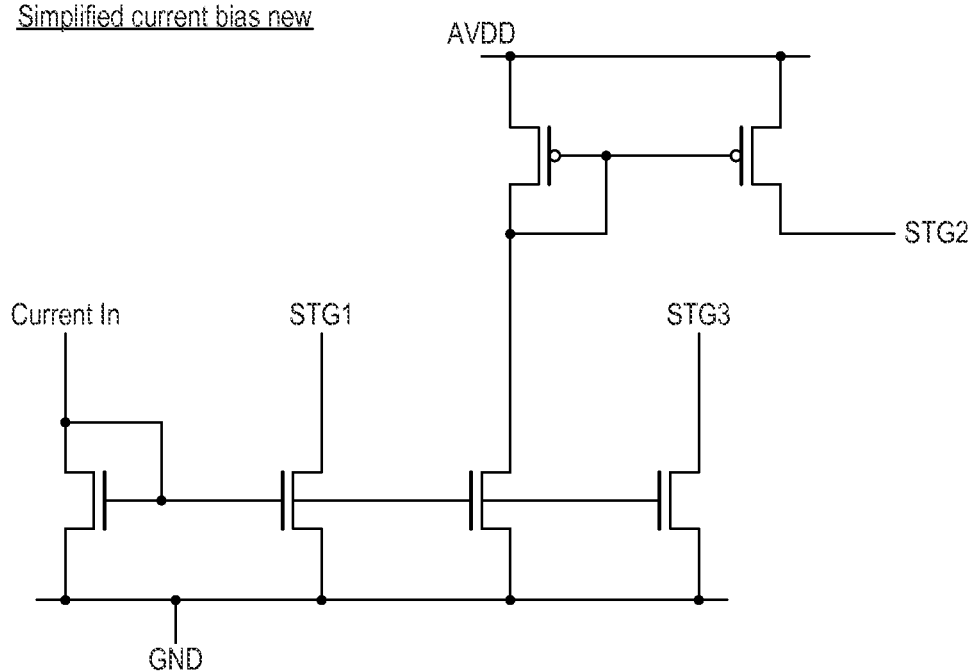

A simplified representation of the new current bias design is shown in FIG. 26, which shows for comparison the "old" (global) and "new" (localized) current bias concepts.

This new PMOS mirror is shown in FIG. 26. The current bias produces the correct amount of current required for each stage. Only the second stage current branch was modified here. The next part of the design was to connect the comparators within a block together in that only one would be diode connected. The rest would act as mirrors across the array. Then, a NMOS mirror could be introduced per block and connected to the one diode connection. The outputs from each of the stage 3 comparators of a block may be individually capacitively coupled to the common bias line to produce a positive feedback effect.

Figure 27:
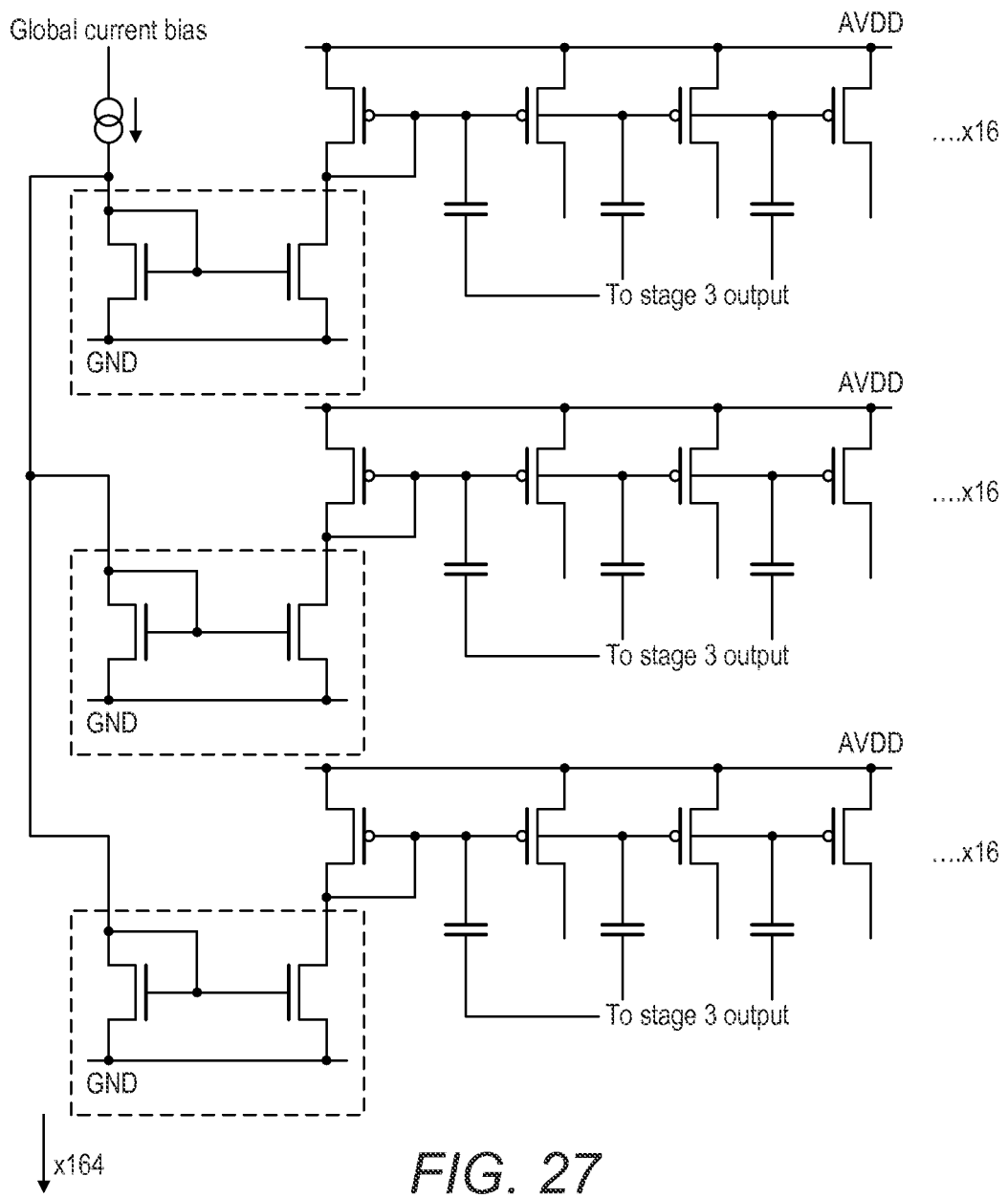
FIG. 27 illustrates an example comparator layout where an NMOS mirror is provided per block of 16 comparators.

FIG. 27 illustrates the NMOS mirror which should be included in each block. This is shown in the areas enclosed with the dotted lines. The bias line will now be local to the 16 columns and will have the capacitance connected to it. Now, the global current bias will not be affected by any kick on the local current bias which was originally contributing to the total smearing value.

Figure 28:
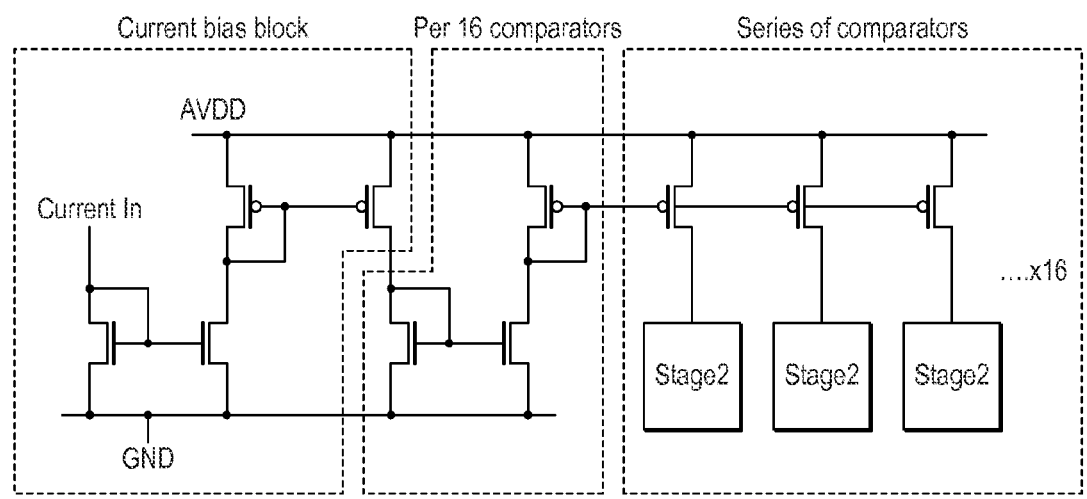
FIG. 28 illustrates further aspects of the design shown in FIG. 27.

FIG. 28 illustrates further aspects of the design. The left-side block outlines the modification to the current bias block and is separate to the comparator itself. The middle block shows the one diode connection per block of comparators. The new NMOS mirror will then be placed next to the comparators themselves (as an alternative, the NMOS mirror could be placed within the blocks themselves). The right-side block shows the block of comparators which are connected together. In an array with 2624 comparators there would be 164 blocks of 16. If the array was not a multiple of 16, it would be possible to have some block of different numbers of comparators.

Figure 31:
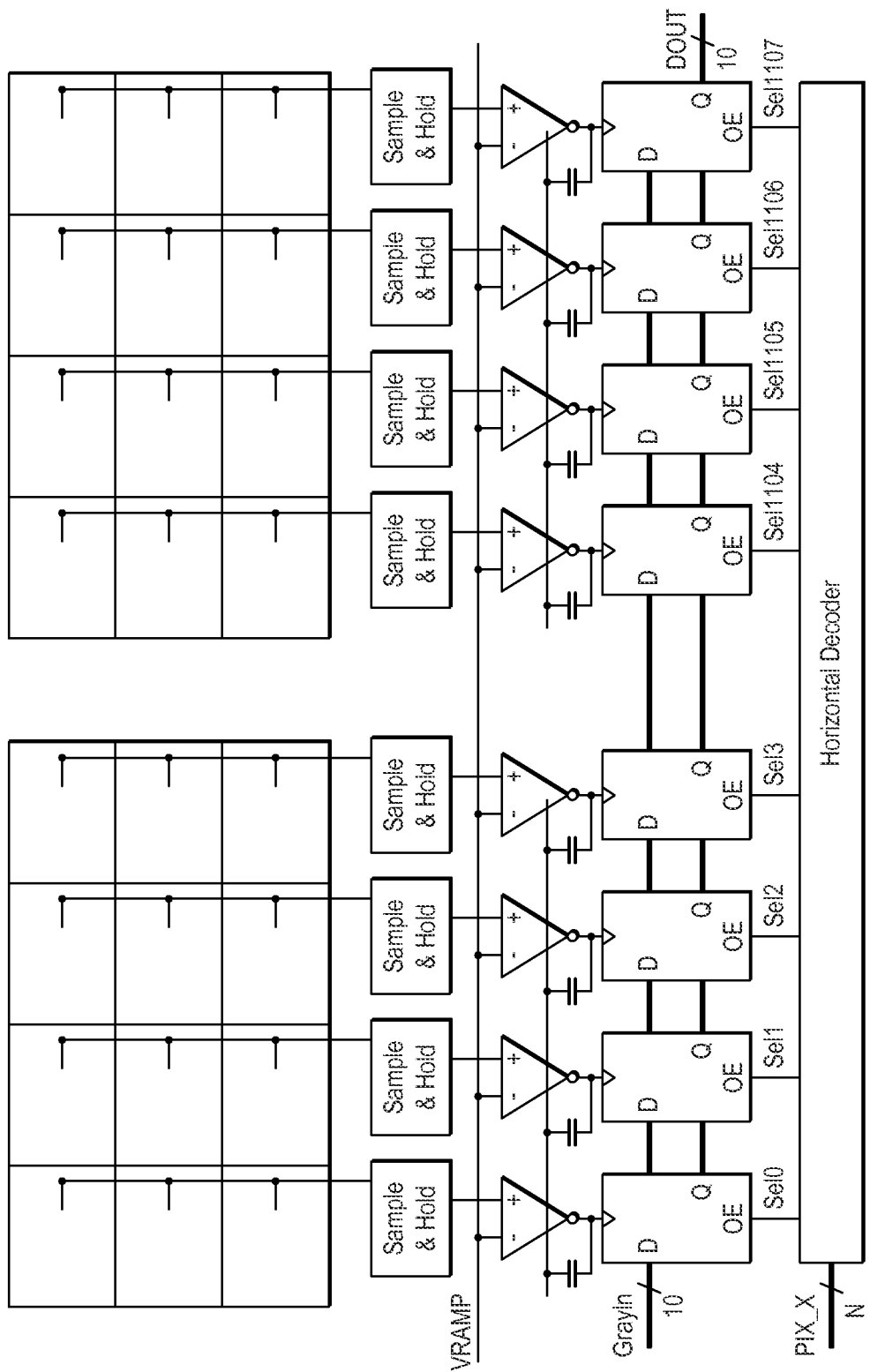

FIG. 31 shows a further embodiment of the disclosure, wherein a positive feedback coupling is provided between each column ADC and a common bias line. The bias line is however split into blocks (two illustrative "blocks" are shown).

Figure 33:
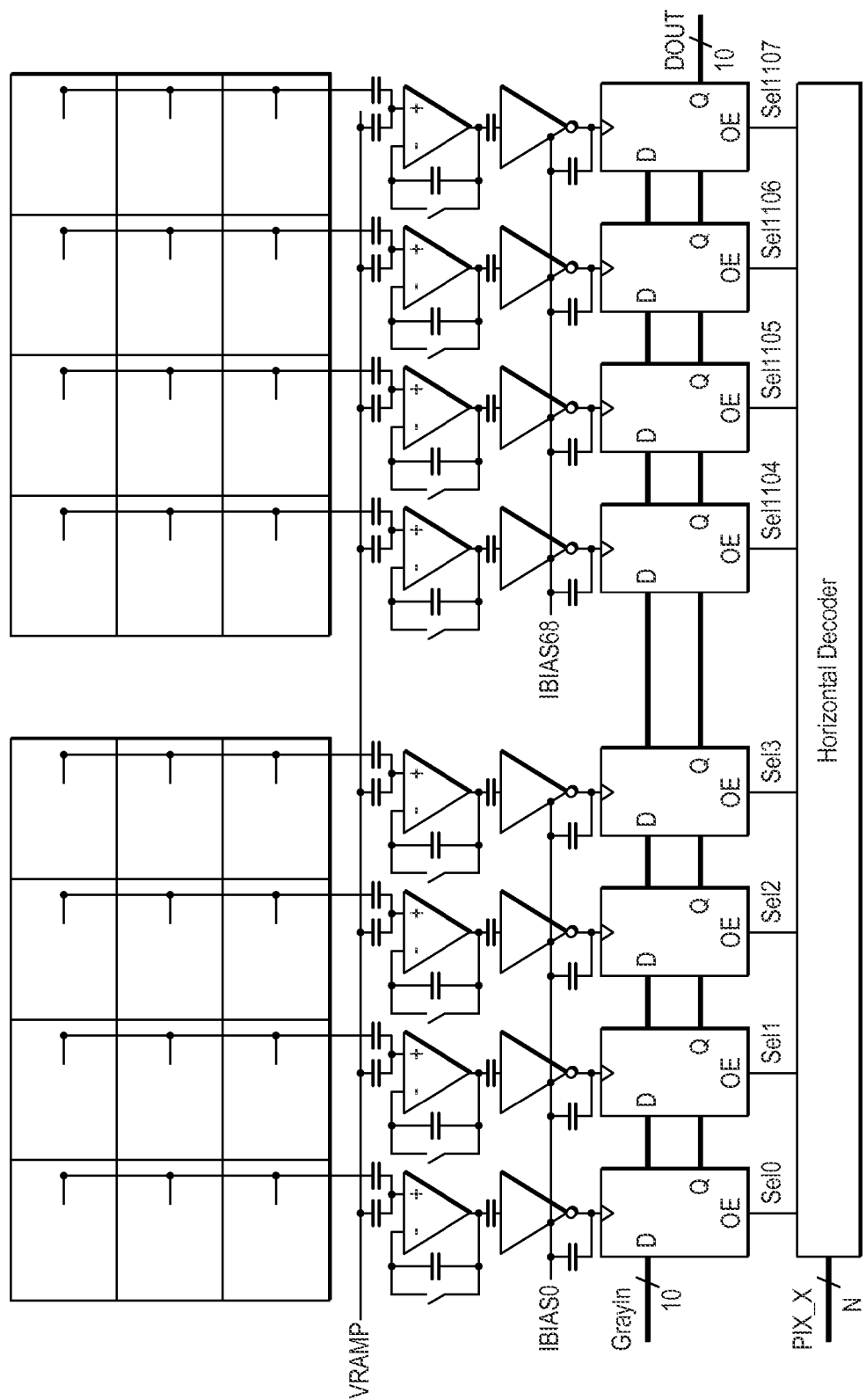

FIG. 33 shows an alternative embodiment of a split bias line, for the continuous time type architecture.

Implementation of the localized current bias line does result in a slight degradation in the noise reduction effect provided for by the positive feedback; the amount of degradation depends on the size of the blocks chosen. Larger blocks will mean less degradation of the noise reduction effect, but also less reduction of smearing. The two features together can be have their parameters selected to achieve a trade off between reduction in temporal noise versus resultant smearing effects.

When the phrase "spatial noise" is used herein, it is used to refer to the different times at which different comparators may fire under the same conditions. Spatial noise presents itself as an image artifact in flat regions of an image, as discussed above. The present disclosure provides a new coupling between an output of one comparator stage and a preceding comparator stage which has been demonstrated to reduce this spatial noise. The increased smearing that results has also been addressed by localizing the current bias lines used to control and power the comparators. This localization brings a slight degradation to the noise reduction, however a designer can choose a trade off between the two effects depending on the circumstances of a particular circuit or a particular application.

A comparator thus modified therefore increases the accuracy and the speed of the ADC as a whole, which improves the quality of an image obtained by an image sensor.

Figure 29:
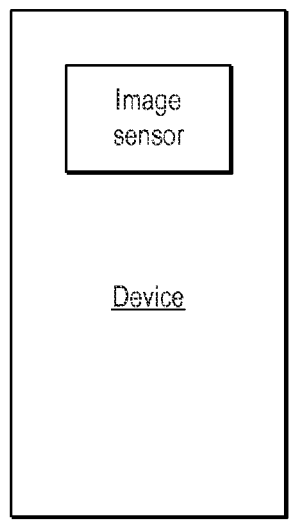
FIG. 29 shows a device incorporating the embodiments of the disclosure.

An image sensor may be provided as part of a number of different devices. FIG. 29 shows a device comprising an image sensor that is equipped with a modified ADC incorporating the techniques taught by the present disclosure.

The device may be a camera, a mobile telephone incorporating a camera, a webcam, or an optical mouse sensor, to name but a few different devices.

Various improvements and modifications may be made to the above, without departing from the scope of the present disclosure.

Feedback may also be provided between the output of the second stage and the current source of the first stage of the comparator structure of the type illustrated in FIG. 8 (or similar). In this case, the amplifier could be modified to prevent the rejection of change.

A further effect for reducing smearing, which could be employed by itself or in combination with the localized bias as described above, would be to increase the amount of columns as this would increase the amount of total capacitance on the current bias node. This may increase the overall noise performance for a given smearing performance improvement.

A further option for limiting smearing, which could be employed by itself or in combination with the localized bias and/or other techniques as described above, could be mixing the comparators which are connected to one current bias line. The blocks of comparators which are connected to a common bias line do not have to be neighboring comparators but could instead be mixed or randomized, which would help limit smearing.

The arrangement of the blocks may also take into account other factors, such as the arrangement of color filter arrays which may overlay the pixel array. A block may be formed to serve pixels that form part of the same color channel. For example, a common color filter array arrangement is the Bayer pattern, which involves a repeating quad of {red, green} (top row) {green, blue} (bottom row) color filters. Blocks could then be specific to red, green or blue channels, that is, they may have columns or comparators which are not physically adjacent. This helps to avoid color aliasing and aids correct color reproduction.

What is claimed is:

1. An image sensor, comprising:
    an array of pixels;
    a first analog to digital converter (ADC) including a first inverting amplification stage and a second inverting amplification stage, wherein an output of the first inverting amplification stage is coupled to an input of the second inverting amplification stage;
    a bias line for the first inverting amplification stage of the first ADC; and
    a positive feedback coupling between an output of the second inverting amplification stage of the first ADC and the bias line.

2. The image sensor of claim 1, further comprising:
    a second ADC;
    said bias line coupled in common to first inverting amplification stages in both said first ADC and second ADC; and
    said positive feedback coupling between second inverting amplification stage outputs of each of the first and second ADCs and the common bias line.

3. The image sensor of claim 1, wherein the first ADC serves one column of pixels in said array.

4. The image sensor of claim 1, wherein the first ADC is formed within and as part of a pixel structure.

5. The image sensor of claim 1, wherein the bias line is global to the array of pixels and each included ADC.

6. The image sensor of claim 1, wherein the bias line comprises a pixel-level bias line that is split to form at least two local bias lines, each local bias line associated with at least one of a plurality of ADCs.

7. The image sensor of claim 1, wherein said positive feedback coupling is provided between the output of the second inverting amplification stage and a current source coupled to the bias line for the first inverting amplification stage.

8. The image sensor of claim 7, wherein the positive feedback coupling comprises a capacitor having a first terminal coupled to the output of the first inverting amplification stage and a second terminal coupled to a control node of the current source.

9. The image sensor of claim 8, wherein the current source comprises a current source transistor having a control terminal, and wherein the control node is the control terminal.

10. The image sensor of claim 8, wherein the capacitor has a capacitance that is less than 1 fF.

11. The image sensor of claim 1, wherein:
    the first inverting amplification stage comprises a first transistor having a first conduction terminal and a second conduction terminal, said second conduction terminal coupled to a supply node;
    a first bias current generator circuit is coupled to the bias line and configured to source current to the first conduction terminal of the first transistor;
    the second inverting amplification stage comprises a second transistor having a first conduction terminal and a second conduction terminal, said second conduction terminal coupled to the supply node, and further having a control terminal coupled to the first conduction terminal of the first transistor; and a second bias current generator circuit is configured to source current to the first conduction terminal of the second transistor;

wherein said positive feedback coupling connects the first conduction terminal of the second transistor to the first bias current generator circuit.

12. The image sensor of claim 11, said array of pixels including a pixel signal output line generating a pixel signal for processing at an input of the first transistor.

13. The image sensor of claim 1, wherein:
the first inverting amplification stage includes a first bias circuit having a control node and configured to source current over the bias line for first inverting amplification stage operation; and
the second inverting amplification stage includes a second bias circuit having a control node and configured to source current for second inverting amplification stage operation; and
wherein said positive feedback coupling connects the output of the second inverting amplification stage to the control node of the first bias circuit.

14. The image sensor of claim 1, wherein the first inverting amplification stage comprises an n-channel MOS transistor with a drain terminal forming the output of the first inverting amplification stage.

15. The image sensor of claim 14, further comprising a first bias circuit including said bias line and configured to source current to said drain terminal.

16. The image sensor of claim 15, wherein the second inverting amplification stage comprises an n-channel MOS transistor with a drain terminal forming the output of the second inverting amplification stage.

17. The image sensor of claim 16, further comprising a second bias circuit configured to source current to said drain terminal of the n-channel MOS transistor of the second amplification stage.

18. The image sensor of claim 16, wherein the positive feedback circuit is coupled between the drain terminal of the n-channel MOS transistor of the n-channel MOS transistor of the second amplification stage and a control node of the first bias circuit.

19. The image sensor of claim 18, wherein the first bias circuit comprises a p-channel MOS transistor having a drain terminal coupled to the output of the first inverting amplification stage, said p-channel MOS transistor further having a control terminal which is the control node of the first bias circuit.

20. The image sensor of claim 1, said array of pixels including a pixel signal output line generating a pixel signal for processing at an input of the first inverting amplification stage.

21. An image sensor, comprising:
an array of pixels;
a first analog to digital converter (ADC);
a bias line for the first ADC; and
a positive feedback coupling between an output of the first ADC and the bias line;
wherein the positive feedback coupling comprises a capacitor having a first terminal coupled to the output of the first ADC and a second terminal coupled to the bias line;

wherein the capacitor has a capacitance that is less than 1 fF.

22. The image sensor of claim 21, wherein the capacitor is coupled between the output of the first ADC and a control node of a bias current generator circuit sourcing current to said bias line.

23. An image sensor, comprising:
an array of pixels;
an analog to digital converter (ADC) including a plurality of gain stages;
a bias line for the ADC;
a positive feedback coupling provided between an output of one gain stage and a current source of a preceding gain stage;
wherein the plurality of gain stages for the ADC are provided in a circuit comprising:
a first transistor providing the preceding gain stage and having a first conduction terminal and a second conduction terminal, said second conduction terminal coupled to a supply node;
a first bias current generator circuit including said current source coupled to the bias line and configured to source current to the first conduction terminal of the first transistor;
a second transistor providing the one gain stage having a first conduction terminal and a second conduction terminal, said second conduction terminal coupled to the supply node, and further having a control terminal coupled to the first conduction terminal of the first transistor; and
a second bias current generator circuit configured to source current to the first conduction terminal of the second transistor; and
said positive feedback coupling connecting an output of one gain stage provided at the first conduction terminal of the second transistor to the first bias current generator circuit.

24. An image sensor, comprising:
an array of pixels;
an analog to digital converter (ADC) including a plurality of gain stages;
a bias line for the ADC;
a positive feedback coupling provided between an output of one gain stage and a current source of a preceding gain stage;
wherein the plurality of gain stages for the ADC are provided in a circuit comprising:
a first inverting amplifier circuit providing the preceding gain stage and having an input and an output, the first inverting amplifier circuit including said current source comprising a first bias circuit having a control node and configured to source current to said bias line for first inverting amplifier circuit operation;
a second inverting amplifier circuit providing the one gain stage and having an input and an output, the second inverting amplifier circuit including a second bias circuit having a control node and configured to source current for second inverting amplifier circuit operation; and
wherein the output of the first inverting amplifier circuit is coupled to the input of the second inverting amplifier circuit; and
said positive feedback coupling connecting an output of the second inverting amplifier circuit to the control node of the first bias circuit.

* * * * *